United States Patent [19]
Ramot et al.

[11] Patent Number: 5,815,566
[45] Date of Patent: Sep. 29, 1998

[54] APPARATUS AND METHOD FOR DYNAMIC INBOUND/OUTBOUND CALL MANAGEMENT AND FOR SCHEDULING APPOINTMENTS

[75] Inventors: Danny Ramot, Fairfield; Jeffrey L. Blamey, Wallingford, both of Conn.

[73] Assignee: Executone Information Systems, Inc., Milford, Conn.

[21] Appl. No.: 731,591

[22] Filed: Oct. 16, 1996

Related U.S. Application Data

[63] Continuation of Ser. No. 123,309, Sep. 17, 1993, abandoned, which is a continuation-in-part of Ser. No. 774,600, Oct. 10, 1991, Pat. No. 5,341,412.

[51] Int. Cl.$^6$ .............................. H04M 3/42; H04M 3/00; H04Q 3/64
[52] U.S. Cl. ......................... 379/265; 379/214; 379/216; 379/309; 379/355
[58] Field of Search ..................................... 379/265, 266, 379/207, 309, 213, 214, 218, 67, 88, 89, 84, 216, 355

[56] References Cited

U.S. PATENT DOCUMENTS

| | | | |
|---|---|---|---|
| 3,989,899 | 11/1976 | Norwich .................................. | 379/201 |
| 4,375,582 | 3/1983 | Gist et al. .................................. | 379/88 |
| 4,408,100 | 10/1983 | Pritz et al. ............................... | 379/207 |
| 4,438,296 | 3/1984 | Smith ....................................... | 379/207 |
| 4,451,705 | 5/1984 | Burke et al. ............................. | 379/207 |
| 4,497,979 | 2/1985 | Phelan . | |
| 4,599,493 | 7/1986 | Cave ........................................ | 379/88 |
| 4,640,989 | 2/1987 | Riner et al. ............................... | 379/94 |
| 4,817,130 | 3/1989 | Frimmel, Jr. .............................. | 379/88 |
| 4,829,563 | 5/1989 | Crockett et al. ......................... | 379/309 |
| 4,860,342 | 8/1989 | Danner ...................................... | 379/96 |
| 4,881,261 | 11/1989 | Oliphant et al. ......................... | 379/215 |
| 4,894,857 | 1/1990 | Szlam et al. .............................. | 379/67 |

(List continued on next page.)

FOREIGN PATENT DOCUMENTS

| | | |
|---|---|---|
| 0460816 | 12/1991 | European Pat. Off. . |
| 0551715 | 7/1993 | European Pat. Off. . |
| WO 9409585 | 4/1994 | WIPO . |

OTHER PUBLICATIONS

C.E. Yates, "Telemarketing and Technology: Perfect Business Partners", AT&T Technology, Short Hills, NJ, vol. 2, No. 3, 1987, pp. 48–55.
European Search Report for PCT/US 94/10516.

*Primary Examiner*—Harry S. Hong
*Attorney, Agent, or Firm*—Dilworth & Barrese

[57] ABSTRACT

A telephone system provides dynamic inbound/outbound call management for a telemarketing campaign to automatically initiate outbound telephone calls for outbound agents, with outbound agents redesignated as inbound agents to answer inbound calls as needed according to at least one threshold of number or duration of waiting calls or number or duration of waiting inbound agents. Each agent's work area includes a telephone station having a display and an input device. The telephone stations are coupled to a server via a network, and the telephone system includes appointment and calendar functions with pop-up menus. The server is also coupled to an automatic dialer and to a private branch exchange. When the server assigns an outbound call to an outbound agent, the server sends information about the party called to the outbound agent's telephone station for display simultaneous with connecting the called party to the outbound agent. The telephone system allows each agent to control all telephone functions through the telephone station using the display and input device. Each agent may dial and control additional calls using the input device, including central office calls, intercom calls and paging. As each outbound call is initiated or completed, system parameters are adjusted to maintain a predetermined minimum number of busy outbound agents. The adjustments also maintain the percentage of unattended outbound calls for which no outbound agent is available.

17 Claims, 16 Drawing Sheets

U.S. PATENT DOCUMENTS

| | | | |
|---|---|---|---|
| 4,896,345 | 1/1990 | Thorne | 379/67 |
| 4,933,964 | 6/1990 | Girgis | 379/67 |
| 4,969,136 | 11/1990 | Chamberlin et al. | 369/29 |
| 4,975,949 | 12/1990 | Wimsatt et al. | 379/387 |
| 5,023,868 | 6/1991 | Davidson et al. | 370/62 |
| 5,025,468 | 6/1991 | Sikand et al. | 379/67 |
| 5,040,208 | 8/1991 | Jolissaint | 379/209 |
| 5,062,103 | 10/1991 | Davidson et al. | 379/67 |
| 5,093,854 | 3/1992 | Sucato | 379/67 |
| 5,101,425 | 3/1992 | Darland et al. | 379/34 |
| 5,113,380 | 5/1992 | Levine | 368/10 |
| 5,181,236 | 1/1993 | LaVallee et al. | 379/67 |
| 5,210,789 | 5/1993 | Jeffus et al. | 379/127 |
| 5,214,688 | 5/1993 | Szlam et al. | 379/67 |
| 5,341,412 | 8/1994 | Ramot et al. | 379/92 |

```
                        CAMPAIGN PARAMETER MENU

CAMPAIGN NUMBER : 01                    PREVIEW DIALING ENABLED (Y/N)   : N
HOLD QUEUES ENABLED (Y/N) : N           TARGET CUSTOMER WAIT TIME       : 02:00
RECORDER ID NUMBER : 00                 MAXIMUM PERCENT ABANDONED CALLS : 50
MINIMUM AGENTS FOR DIAL-AHEAD : 06      AVERAGE AGENT WAIT TIME         : 06
MAXIMUM RE-DIALS : 03                   BUSY RESCHEDULE TIME            : 00:15
NO-CONNECT RESCHEDULE TIME : 00:40      NO-AGENT RESCHEDULE TIME        : 01:00
RING-NO-ANSWER RESCHEDULE TIME : 04:00  PASS OPERATOR INTERCEPT (Y/N)   : Y
                                        PASS ANSWERING MACHINE  (Y/N)   : Y

---------------------- CAMPAIGN DIAL SELECTION ----------------------

0                   1                   2
         0011223344556677889900112233445566778899001122 33
TIME     NNNNNNNNNNNNNNNNNNNNNNNNNNNNNNNNNNNNNNNNNNNNNNNN
SUN      NNNNNNNNNNNNNNNNNNNNNNNYYYYYYYYYYYYYYYYYYYNNNNN
MON      NNNNNNNNNNNNNNNNNNNNNNNYYYYYYYYYYYYYYYYYYYNNNNN
TUE      NNNNNNNNNNNNNNNNNNNNNNNYYYYYYYYYYYYYYYYYYYNNNNN
WED      NNNNNNNNNNNNNNNNNNNNNNNYYYYYYYYYYYYYYYYYYYNNNNN
THU      NNNNNNNNNNNNNNNNNNNNNNNYYYYYYYYYYYYYYYYYYYNNNNN
FRI      NNNNNNNNNNNNNNNNNNNNNNNYYYYYYYYYYYYYYYYYYYNNNNN
SAT      NNNNNNNNNNNNNNNNNNNNNNNNNNNNNNNNNNNNNNNNNNNNNNNN

F1-EXIT  F2-SAVE  F3-DEFAULT DIAL SELECTION  F4-TOP HALF  F5-BOTTOM HALF
PLEASE ENTER IN A CAMPAIGN NUMBER FROM 1 TO 14.
```

FIG. 11

APPARATUS AND METHOD FOR DYNAMIC INBOUND/OUTBOUND CALL MANAGEMENT AND FOR SCHEDULING APPOINTMENTS

CROSS REFERENCE TO RELATED APPLICATIONS

This is a continuation of application Ser. No. 08/123,309, filed Sep. 17, 1993, now abandoned, which is a continuation-in-part of application entitled APPARATUS AND A METHOD FOR PREDICTIVE CALL DIALING having Ser. No. 07/774,600, filed Oct. 10, 1991, now U.S. Pat. No. 5,341,412 issued Aug. 23, 1994.

FIELD OF THE INVENTION

This invention relates generally to telephone systems, and particularly to a dynamic call management system and method for use in an inbound/outbound predictive dialing telemarketing environment.

BACKGROUND INFORMATION

Predictive dialing is a technique for scheduling the dialing of calls to provide an answered call almost immediately after an agent becomes available from servicing a previous call.

Predictive dialing systems have found increased applications in automated dialing systems of telephone data collection networks to enhance productivity in telemarketing environments; for example in business, and political and charitable telemarketing campaigns. Using queue and waiting-line models of inbound and outbound calls, predictive dialing systems allow telemarketing agents to address more outbound calls dialed by an automated dialer with greater efficiency, allowing the telemarketing agents to increase the number of successfully served customer contacts, and therefore to increase the success of the telemarketing campaign.

Automated dialing systems eliminate some unproductive uses of the agents' time. In automated dialing systems, telephone numbers are dialed under control of one or more computers, and the automated dialing systems recognize rings, busy signals and answers. Automated dialing systems may also detect whether each agent is currently engaged in a call, or is available. A call is not transferred to an agent until an answer is detected by the system and the agent is available. The agents are thus provided with a steady stream of answered calls. Automated dialing ensures uniform coverage within the range of telephone numbers targeted.

In order to maximize the number of calls each agent services, an automated dialing system may incorporate a predictive dialing system to dial an outbound call and detect that the call has been answered before an outbound agent is available, thus maximizing an outbound agent's contact with a greater number of potential customers.

Systems using predictive dialing techniques which provide for agents to serve only as outbound agents for addressing automated dialed outbound calls, or only as inbound agents for answering inbound calls suffer from drawbacks such as allowing inbound calls to divert or interrupt outbound agents from addressing outbound calls, thus reducing the efficiency of the automated dialing system; or resulting in the neglect or ignoring of the inbound calls by the outbound agents. Typically, outbound agents had to manually logoff or signoff from the outbound agents' computer workstations to answer inbound calls or to manually logoff from an outbound computer system in order to manually logon to an inbound computer system.

The efficiency and success of telemarketing campaigns depend upon contacting and bringing in as many people as possible to contribute to or to buy from the telemarketing campaign. For example, blood drive campaigns rely upon obtaining people to make appointments to arrive at specific blood drive locations to give blood. The advantageous uses of automated appointment and calendar features and functions by both inbound and outbound agents increases the efficiency and success of the telemarketing campaign.

Therefore, it would be advantageous to increase the efficiency of the agents to access a calendar and to make appointments through the use of pull-down or pop-up menus as well as through windows overlapping current workstation display screens. In addition, the use of function keys or preassigned keystrokes to an input device, such as a keyboard, a mouse, or a handset, to bring up or generate specialized display screens for displaying a calendar and available dates and time slots increases the efficiency of agents to make and save appointments.

A predictive dialing system having a calendar function is described in U.S. patent application entitled APPARATUS AND A METHOD FOR PREDICTIVE CALL DIALING having Ser. No. 07/774,600, filed Oct. 10, 1991, which is incorporated herein by reference.

It would also be more efficient for a predictive dialing system to automatically display the party information on an outbound agent's display on a specialized display screen substantially simultaneous with the connecting of the outbound agent to the intended party. An additional advantage would be to have such preexisting party information automatically transferred by the automated dialing system to appointment screens on an outbound agent's display upon access by the outbound agent to the appointment functions, thus avoiding the outbound agents having to manually enter the party information which the automatic dialing system already possesses.

SUMMARY OF THE INVENTION

The present invention is embodied as a telephone system comprising a server and a data source for use as a predictive dialing system including a dialer for automatically dialing telephone calls, a private branch exchange (PBX) connected to a plurality of telephone stations, with each telephone station assigned to one of a plurality of agents. The data source includes a dialer database for storing telephone numbers and client information to be dialed, and an appointment database for storing appointment information. The server has a processing unit, associated memory, and stored programs with the processing unit including designating means for designating agents as either inbound agents or outbound agents, detecting means for detecting that one of the agents is available to answer a call, assigning means for assigning and connecting a call to an available agent, queue means for generating queues of calls and agents, threshold means for detecting when a queue exceeds at least one threshold, and access means for controlling access of an agent to the telephone system to log the agent on or off the telephone system. The associated memory includes agent, dialer, and appointment databases, a call queue, and an agent queue. Each telephone station includes an input device, a display, a processor, and a buffer. The processor controls the telephone station, and each telephone station provides full telephone keypad functionality for dialing outbound calls and for recording data gathered from called parties, allowing an agent to focus attention more productively on conversing with customers and recording data.

The present invention provides additional functions for agents to schedule appointments with the parties called; for example, telephone campaigns to schedule blood donation appointments. The processor of each telephone station includes means for generating and changing appointment information and for generating a calendar using a calendar function. The calendar function is provided to display the dates for which appointments are available. Once a date is selected and entered into the telephone station, the available time slots are automatically displayed. The calendar function automatically updates the appointment database of remaining available appointments with each appointment scheduled.

Agent productivity is further enhanced by improved scheduling methods. The rate and time at which outbound calls are dialed closely tracks the rate and times at which outbound agents become available to respond to the outbound calls.

The telephone system uses predictive dialing techniques to provide optimal call scheduling with alternative methods for responding to outbound calls which are completed before an outbound agent is available. A system administrator may choose to immediately terminate these calls, or to play a recording until an outbound agent becomes available. The system administrator may also configure the telephone system and adjust the scheduling rate to reduce the occurrence of these unattended outbound calls to the level desired.

BRIEF DESCRIPTION OF THE DRAWINGS

The features of the present invention will become more readily apparent and may be better understood by referring to the following detailed description of an illustrative embodiment of the present invention, taken in conjunction with the accompanying drawings, where:

FIG. 11 shows a Campaign Parameter Profile screen;

DETAILED DESCRIPTION OF THE EXEMPLARY EMBODIMENT

Figure 1:
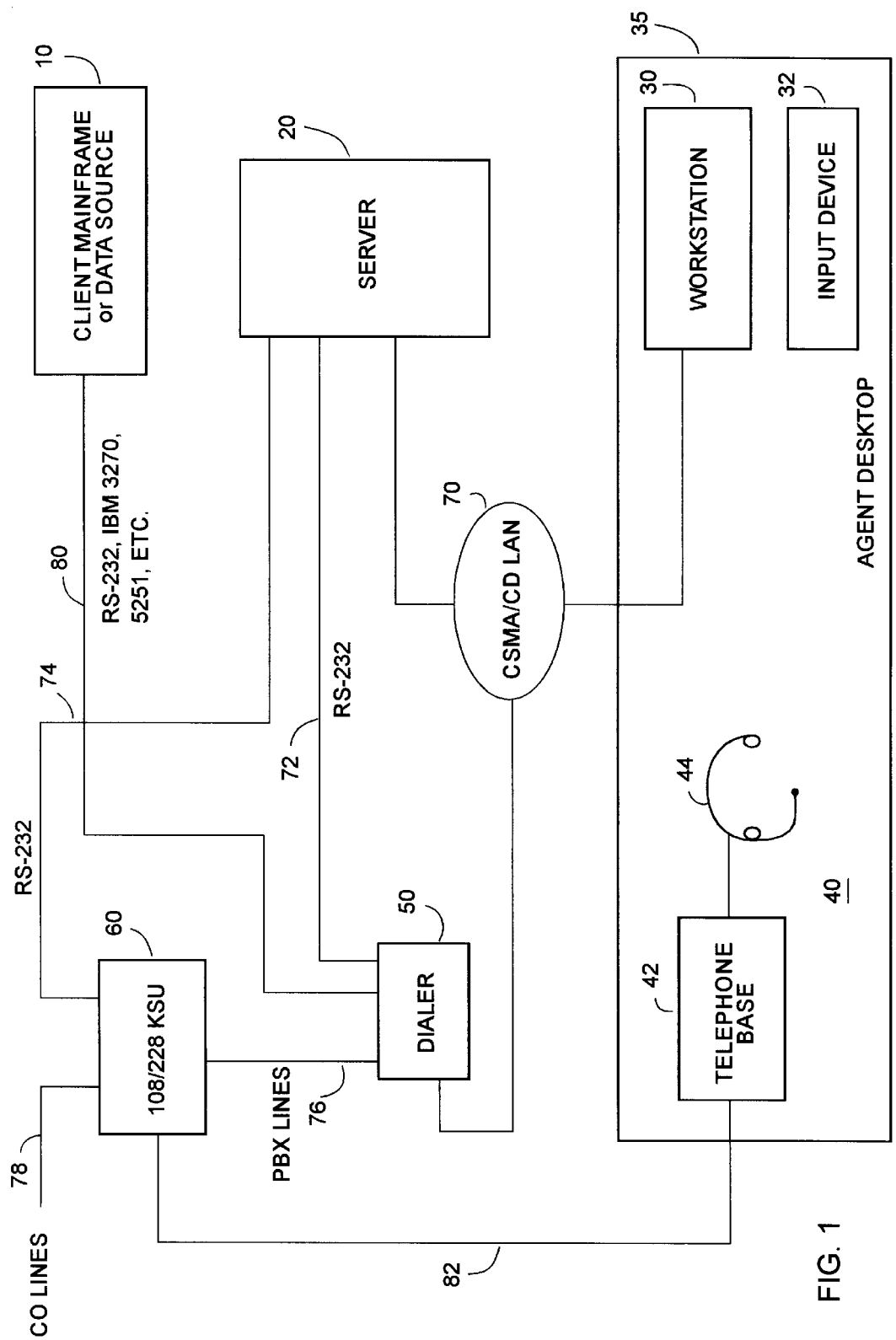
FIG. 1 is a block diagram showing the hardware components of the predictive dialing system.

Referring now in specific detail to the drawings, with like reference numerals identifying similar or identical elements, the following is a description of an exemplary automated dialing system in accordance with the present invention.

FIG. 1 shows a block diagram of a hardware configuration operating the predictive dialing system. The system serves a plurality of agents who may be employed in telemarketing, charity campaigns, political canvassing, surveys, debt collection, or other activity requiring a large number of direct telephone calls to the public. Each agent has a work area such as desktop 35. The desktop includes a computer video display terminal 30 and an input device 32, such as a mouse or a keyboard. Although the invention can be implemented using a fixed function display terminal or personal computer, an intelligent workstation (e.g., an IBM AT compatible personal computer having an Intel 80386 microprocessor and operating under control of the Xenix 386 operating system) is used in the exemplary embodiment. The agent desktop 35 also includes a digital telephone set 40 including at least a base 42 and a headset 44. The telephone set 40 can be single line, multikey, or multikey with a display.

The agent workstations 30 are connected to a server computer 20 (e.g., a computer identical to one of the workstation computers) via a standard Local Area Network (LAN) 70 protocol, such as Carrier Sense Multiple Access with Collision Detection (CSMA/CD) protocol. Other server computers and LAN protocols are also contemplated for the predictive dialing system.

In addition to the LAN interface, the server computer 20 is connected to an automatic dialer 40 for example, an Infostar dialer available from Executone Information Systems, Inc., via a standard RS-232 interface 72 and to a private branch exchange (PBX) 60, which may be, for example, a Key Set Unit (KSU) such as the ISOETEC 108/228 communications processor also available from Executone Information Systems Inc. The automatic dialer 50 is connected to PBX 60 by lines 76, and controls the PBX.

It provides the digital dialing input to the PBX 60 and monitors the calls, providing server computer 20 with call status. In particular automatic dialer 50 notifies server 20 when line busy, ring-no-answer, and live-call status are detected.

In addition to the automatic dialer 50, the PBX 60 interfaces to a plurality of agent telephones 40 having bases 42 and headsets 44 and to Central Office (CO) lines 78. The PBX 60 produces the Dual Tone Multifrequency (DTMF) signal required to initiate a call on the CO lines, in response to signals provided by the automatic dialer 50 over lines 76.

The server computer 20 receives a daily download of target telephone numbers and appointment data at the beginning of each day, from a data source computer 10, such as a mainframe or mid-sized computer. These telephone numbers are stored in the server computer so that no further interactions between the server 20 and the data source computer 10 are required for the remainder of the business day. At the end of the business day, the server computer 20 uploads a record of the day's activity back to the data source computer 10. In the exemplary embodiment, it is not necessary to provide a direct communications link between the server computer 20 and the data source computer 10. The automatic dialer 50 includes the hardware or firmware needed to do protocol conversion between the server protocol 72 and the data source computer protocol 80.

In this configuration, the dialer 50 provides the interface between the server 20 and the agent's mainframe computer 10. This is appropriate since the dialer 50 is only used as an interface to transfer data between the mainframe computer 10 and the server 20 at the start or end of a campaign, that is to say, when its dialer functions are not being used. Alternatively, a direct connection may be established between the mainframe computer 10 and the server 20.

The typical method of operation of the system is described in the following paragraphs. The data is downloaded from the data source 10 to the server 20 for one or more campaigns. The agents who have logged in for the day are each assigned a campaign attribute in the server's database, so that each agent will only be assigned calls from a single campaign. The server 20 sorts the telephone numbers it receives into campaigns and transmits these numbers, one per call, to the automatic dialer 50. The dialer dials the number, providing an output signal over lines 76, which is translated into DTMF tones by PBX 60. The DTMF tones initiate a connection over the central office lines 78.

The PBX also provides signals to the automatic dialer 50, indicating whether the call status is busy, ringing, or a "live call." The automatic dialer 50 in turn provides the status information to the server computer 20. If the server 20 is notified of a live call, the server 20 determines whether an agent is available, i.e., he is logged on, is not currently engaged in a call, and has set his status to available through manual input to the workstation 30. If two or more agents are available, the call is assigned to the agent who has been available for the longest time.

Having selected the agent, the server provides control codes to the PBX 60 indicating the telephone set to which the call will be transferred. These control codes are provided to a control input port of the PBX, such as the port which would be used to connect the PBX 60 to an automated attendant. PBX 60 responds to these control codes by transferring the call to the appropriate telephone set 40. PBX 60 provides a unique triple beep signal to the telephone set 40, indicating that the transfer of a live call will follow immediately. This prepares the agent to respond to the called party's greeting as though the agent has heard it; actually, the greeting is generally completed by the time the transfer of the call to the agent is complete.

While the call is being transferred to the agent, the server computer 20 is simultaneously transferring data records to the agent's workstation 30. The workstation 30 displays basic called party information (e.g., name, address, and phone number) which allows the agent to establish the identity of the called party before proceeding further with the call.

After providing the called party's identity, the workstation 30 displays more detailed information for processing the call, and provides input fields into which the agent can enter responses to predetermined questions via input device 32, for example, a computer keyboard or a mouse pointer device.

The present invention provides the agent with full telephone keypad functionality in the display terminal 30. The agent is focused on the dual tasks of simultaneously maintaining a conversation and entering data into the terminal 30. The ability to perform these tasks without error is improved if the agent does not have to divert his hands from the input device 32 or his attention from the display terminal 30 in order to operate the telephone set 40.

During any ongoing call, the agent can use the input device 32 to adjust the volume of the call up or down, completely mute the agent's voice transmission, or restore the agent's voice transmission (unmute) when it is muted. Using only the input device 32, the agent can release the call without disconnecting (flash), to simulate the operation of the telephone hookswitch, and disconnect (hangup) from the called party.

In addition to the functions provided during calls, the present invention allows the agents to originate intercom calls, CO calls and pages from their terminal input device 35 without pressing any of the keys of the base 42 of the telephone set 40. When intercom calls (handled by the PBX) and CO calls are made, the entire phone number is entered at the keyboard 32 followed by a carriage return. The number appears on the display 30 as it is entered. Then it is translated into control codes and transferred to the PBX 60.

Unlike dialing the number using the telephone set 40, the agent can erase incorrect numbers with the backspace key and re-enter them. After the entire dialed number or other function is entered correctly, the server reformats the message into a set of control codes for the PBX 60.

These control codes are applied to the control input port of the PBX 60 which performs the function requested by the operator.

The present invention enables an agent to broadcast a message to any one of 9 page zones serviced by the PBX, or to all 9 zones simultaneously, under keyboard control. Two different kinds of paging are available. With the first type (internal paging), messages are transmitted to zones where telephones are installed. Messages are heard through the speakers in the paged telephone headsets 44.

The second type of paging is external paging. External paging messages are broadcast through external loudspeakers independent of the telephone extensions. This is useful in locations where telephone extensions are not installed, or in zones beyond the audible range of internally paged messages from telephone extensions.

An added feature of the paging function allows the paged party to rapidly establish a connection with the paging party. The agent requests in his paging announcement that the paged party should dial a two digit code from any phone. The agent remains on the line after completing his announcement. When the two digit code is dialed, the paged party is immediately connected to the agent.

The method for controlling the phone functions from the input device 32 is as follows. Input device 32 commands cause the transfer of a message to the server 20 via the LAN 70. This message identifies what key has been pressed. If the message entails pressing a number of keys, these are collected in the server until a carriage return is received. In response to this message, the server computer 20 puts the command in a format suitable for the control port of the PBX 60 and sends the command over line 74 to PBX 60.

The control input port of the PBX 60 is the same port that would be used if the PBX 60 were connected to an external control device, such as an automated attendant. The format of the control message is different for different types of PBX and so, is not described in detail.

Line 74 between server 20 and PBX 60 operates in parallel with line 82 between the telephone set 40 and the PBX 60, so that the capability to control phone operation via the key pad on the telephone base 42 is not degraded.

A further advantageous feature of the system is the automated calendar tool with which agents schedule appointments for the called parties. This is particularly useful for campaigns such as blood drives, in which successful calls result in appointments. The predictive dialing system maintains an appointment database. Once the calendar tool is initiated, the locations at which the called parties may be served are displayed on the workstation 30 display via a pop-up menu such as that shown in FIG. 1a. The agent enters the party's choice of location via input device 32 and a further pop-up menu, shown in FIG. 1b, displays a monthly calendar in which days having available time slots at the chosen appointment site are highlighted. The agent enters the party's choice of date via input device 32 and a further pop-up menu, shown in FIG. 1c, displays a listing of the available time slots for the chosen date. The system allows multiple appointments to be scheduled for each time slot in accordance with the number of parties actually served at once. If this capability is used, the system automatically updates the calendar function database to keep track of the number of available appointments for each time slot at each location. Finally, the calendar function allows the agent to cancel a previously scheduled appointment using the same pop-up menus described above.

In addition to the new agent functions described in the above description, the predictive dialing system employs improved scheduling methods. These methods result in a high percentage of each agent's time being spent in productive conversation. Another measure of the value of the scheduling method is the frequency with which a live call is established with no agent available to attend the call. The predictive dialing system allows the system administrator to choose from two alternative methods for handling these "unattended" calls. The system can be set up to drop (i.e., disconnect from) a live call as soon as it is determined that no operator is available. Alternatively, unattended calls may be placed in a queue, so that agents are assigned to the queued calls on a first-in, first-out (FIFO) basis as the agents become available.

The selection of whether to allow queuing of unattended calls is based on an assessment of the impact the delays will have on the overall success of the campaign. In a typical campaign, only about 50% of the calls dialed result in live connections with a called party. The bulk of the calls result in a busy signal or a ring without answer. Given this situation, there may be reluctance to drop a call once it is established. On the other hand, requiring the called party to wait may result in reduced receptiveness for the agent's message. In some cases the called party even hangs up before the agent becomes available. Whichever method is selected, the predictive dialing system minimizes the number of unattended calls.

Figure 2:
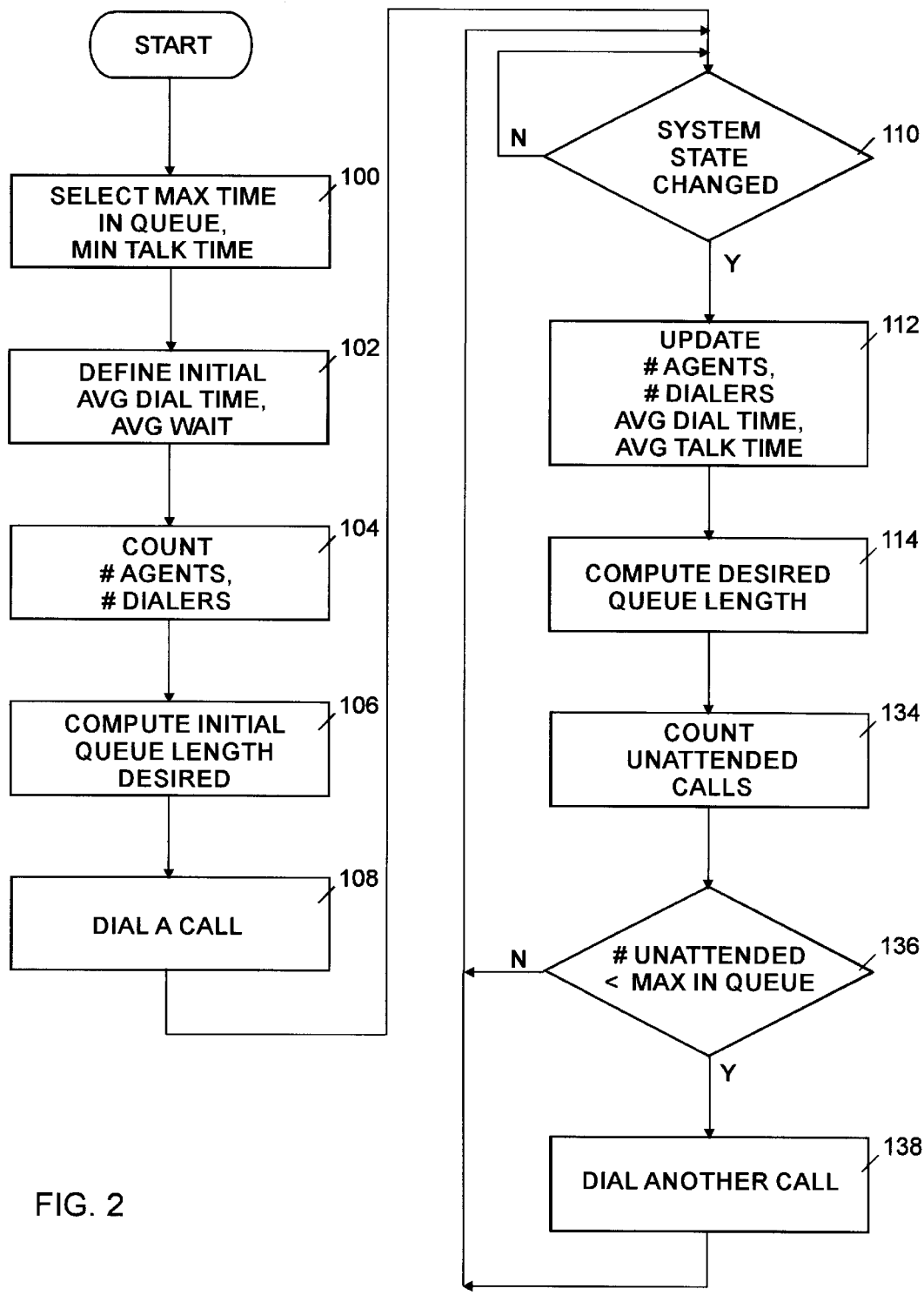
FIGS. 2 and 2a are flow chart diagrams for the scheduling method used in the system shown in FIG. 1, when unattended calls are placed on hold till an operator is available.

FIG. 2 shows a flow chart of the scheduling method for the predictive dialing system with a call wait queue. At step 100, the system administrator selects initial operating parameters for the system. The two parameters which are used as to measure the quality of service are 1) the time a called party must wait for an agent after answering the phone and 2) the percentage of time that each agent spends engaged in conversation with called parties. It is desirable to minimize the maximum time that a party must wait while maximizing the number of agents that are attending to called parties at any given time. These goals are conflicting, however, since if the queue of waiting calls is empty then agents are likely to be idle while if agents are being fully utilized, it is likely that clients are spending excessive amounts of time waiting for an operator to become available. To be effective, the system desirably achieves a balance between these two competing goals.

At step 102, the administrator enters initial estimates for the average dialing time per call and the average time spent by the agent per conversation. The average dialing time includes actual dialing time, plus the time spent waiting for an answer. Failed calls (busy and ring with no answer) are included in the average. The average time spent by the agent per conversation includes a brief period between calls known as "wrap up," during which the agent is not available to answer additional calls. During this period, the agent may take a short break or may finish any data entry associated with the last call. These estimates may initially be provided using modelling data or estimates based on results from other campaigns or other installations.

Figure 2A:
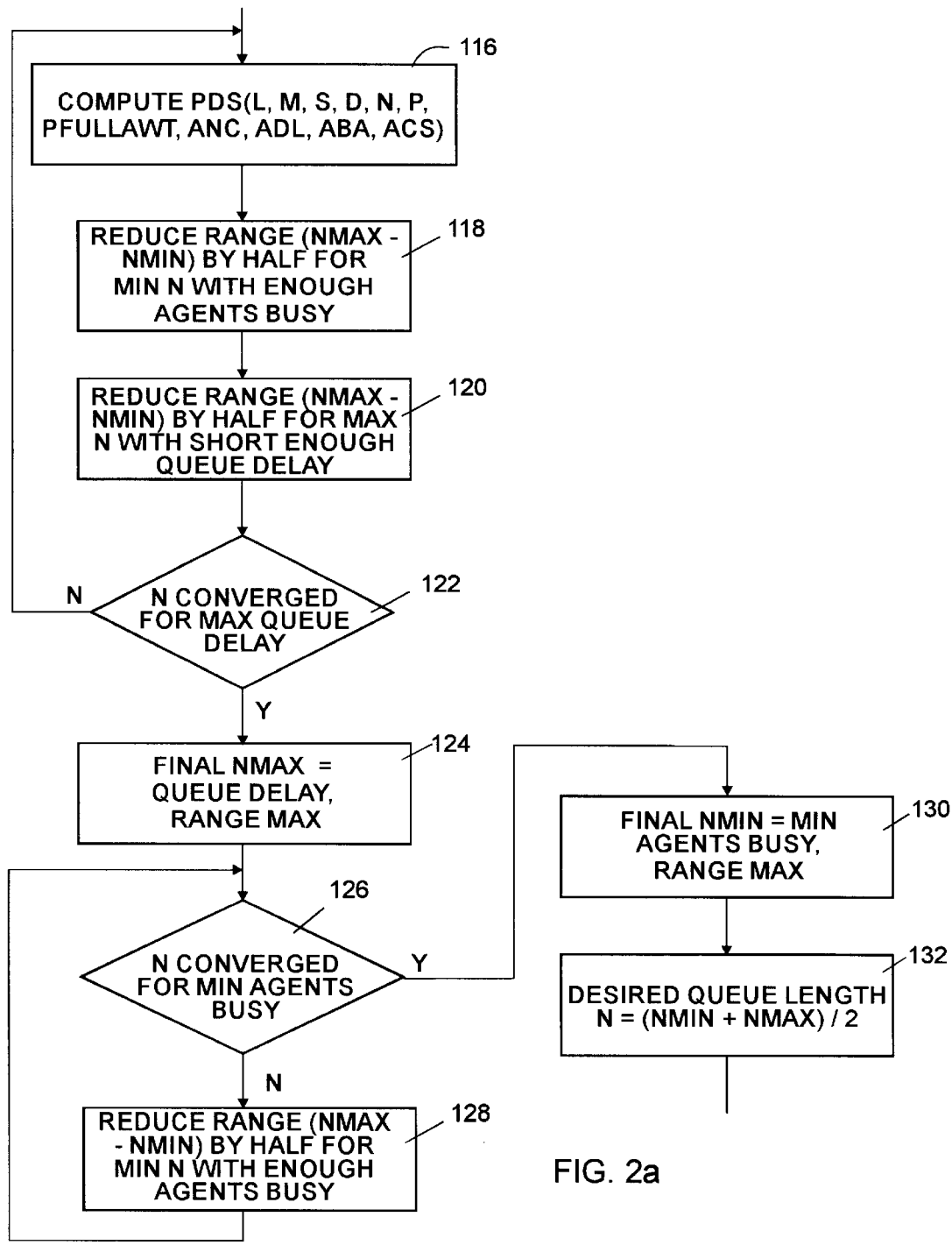

At step 104, the system counts the number of agents currently available to receive calls and the number calls that can be initiated by the automatic dialer 50. At step 106, an initial average queue waiting time is computed based on the previously calculated parameter values. The specific algorithm used is described below with reference to FIG. 2a.

At step 108, with all initial parameters set, the system is ready to begin automatic dialing of calls. At step 110, the system is in a wait state until a state change occurs. A state change may be the called party answering a call, an agent beginning a conversation, completion of a conversation, or a change in the number of active agents or the number of calls that can be initiated by the dialer. At step 112, when any one of these state changes occurs, the number of active agents and the number of active calls for the dialer are counted. The average dial time and the average time a called party waits for an agent after answering are updated with the new results.

At step 114, the system employs its scheduling method to update the desired maximum number of called parties waiting for an agent at any given time. Step 114 comprises detailed steps 116 through 132, shown in FIG. 2a. The scheduling method is based upon modelling the predictive dialing system as a time homogeneous Markov process, also known as a birth and death process. This model defines the behavior of the system in terms of its current state without regard to the details of its history at each previous point in time. The birth and death process is described in detail in a textbook by H. M. Wagner entitled *Principles of Operations Research*, Prentice Hall, 1969, pp 869–875, which is hereby incorporated by reference.

The general steady-state behavior of the homogeneous Markov process is described by equations (1) and (2):

$$L(n-1)*P(n-1)=[L(n)+M(n)]*P(n)-M(n+1)*P(n+1) \text{ for } n>=1 \quad (1)$$

and $$L(n)*P(n)=M(n+1)*P(n+1) \text{ for } n=0 \quad (2)$$

where:

n=the number of call in the queue

L(n)=the arrival rate with n calls in the queue

M(n)=the departure rate with n calls in the queue

P(n)=the probability that n calls are in queue

For the predictive dialing system, live calls, i.e. those that are answered by called parties, enter the queue according to a Poisson process, with a constant input rate L for all values of n. Agents become available and respond to live calls according to an exponential distribution, M. There are a limited number of agents, S, and a limit N on the number of calls in queue. Thus, the maximum number of attended plus unattended calls at any time is given by (S+N). The equations (3), (4) and (5) define the probabilities of having a given number of calls in the system.

$$L*P(n)=M*P(n+1) \text{ for } n=0 \quad (3)$$

$$L*P(n-1)=(L+M)*P(n)-M*P(n+1) \text{ for } 0<n<S+N \quad (4)$$

$$L*P(n-1) = M*P(n) \text{ for } n=S+N \tag{5}$$

From these equations, the equations (6), (7) and (8) can be derived which define the probability of having n calls in the system (i.e. in the queue and being handled by agents).

$$P(0) = 1 / \left[ \sum_{n=0}^{S} (R^n/n!) + R^{S+1}/(S*S!)*(1-R^N/S^N)/(1-R/S) \right] \tag{6}$$

$$P(n) = R^n * P(0)/n!, \text{ for } n <= S \tag{7}$$

$$P(n) = R^n * P(0)/(S!*S^{(n-S)}) \text{ for } S<n<=S+N \tag{8}$$

where:
R=L/M and
! is the factorial function

Steps 116 through 132 comprise a half interval technique for selecting a value for N, which defines the maximum the number of calls in the queue, given the remaining system parameters. At step 116, initial ranges are determined for N, setting the minimum value at 1 and the maximum value at twice the number of agents. The initial value of N is set equal to the midpoint of the range. This value and the process values set in steps 102, 104 and 112 are applied to the above equations to determine the probability density function, P, for the number of calls in the system, the probability, P(0), that the system is empty and the probability, P(N+S), that the system is full. From these probability values, the expected queue wait time, the expected number of calls, the expected queue length, the expected number of busy agents, and the expected number of calls served may be calculated, using the values collected in steps 102, 104 and 112.

At step 118, the range for N is reduced by half, to converge on the N value which satisfies the minimum agent busy-time constraint. If the expected number of busy agents is greater than the target value, then the range for the number N (the maximum number of callers in the queue) may be decreased, so the new range maximum is set to the old midpoint. If the target number of busy agents was not met, however, then the range for N is increased so that there is a larger pool of callers available for the idle agents. In this instance, the new range minimum is set to the old midpoint. If the required average number of busy agents is met exactly, then the final minimum value for N is established. This value represents the smallest maximum queue size that meets the operator busy time requirement.

At step 120, a second range reduction process is performed, to converge on the maximum queue size which complies with the allowable queue waiting time constraint. Given a constant number of agents, the expected queue waiting time, or queue delay, over the interval is directly proportional to the number of callers in the queue. Consequently, the queue delay used in the flow-chart diagram is the number of callers in the queue. This process is essentially the same as the process outlined above except that, during each iteration, if the expected maximum queue delay exceeds the preset maximum queue delay, the new range maximum is set to the old midpoint and if the expected maximum queue delay is less than the preset maximum delay value, the new range minimum is set to the old midpoint. If the expected waiting time matches the maximum waiting time then the final maximum value for N is established.

If the expected waiting time does not match the maximum waiting time then, at step 122, the steps 116, 118 and 120 are repeated until the difference between the maximum queue waiting time and the minimum queue waiting time is unity. The maximum queue length is set to the average of the minimum and maximum queue waiting times.

This maximum queue length represents a queue length at which the expected queue delay equals the desired maximum queue delay. The remainder of the program calculates a minimum queue length at which the desired expected number of busy agents is achieved.

At step 126, a further test is made to determine whether the first range for N has converged on a minimum value, for which the required agent busy time is met. If not, then the minimum range is reduced at step 128. Steps 126 and 128 repeats the same processes performed at steps 116 and 118. Steps 126 and 128 are repeated until the difference between the minimum number of busy agents and the maximum number of busy agents is unity. At step 130, the final minimum value of the range for N is set to the N value provided in step 128.

At step 132, the final value for N is set to the average of the final minimum value provided in step 130 (or step 118), and the final maximum value provided in step 124. This value represents a desired queue length which makes a compromise between the maximum wait in the queue and the minimum number of busy agents.

At step 134, the current number of unattended calls in the queue is counted. At step 136, the number of unattended calls is compared to the newly updated desired value of N provided in step 132. If the actual value is less than the desired value, more calls are dialed. If the actual value exceeds that desired number of calls, then the predictive dialing system does not dial any further calls until a new value for N has been calculated using the steps 110 through 132.

Figure 3:
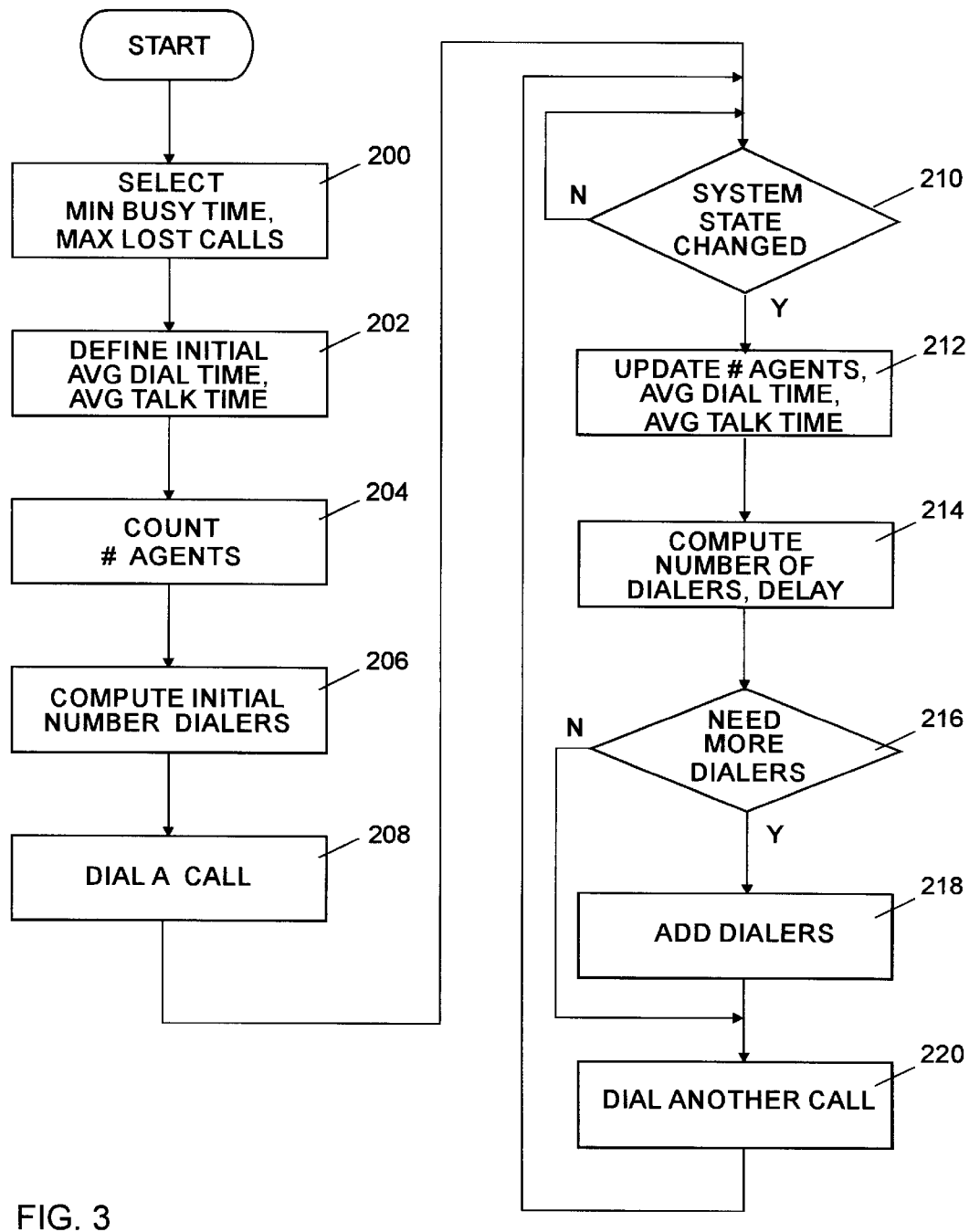
FIGS. 3 and 3a are flow chart diagrams for the scheduling method used in the system shown in FIG. 1, when unattended calls are immediately dropped.

FIG. 3 shows a flow chart of the scheduling method for the predictive dialing system without a call wait queue. At step 200, the system administrator selects initial operating parameters for the system. The two parameters which measure the effectiveness of the system are the percentage of calls which are disconnected because no agent is available, and the number of agents that are engaged in conversation with called parties at any given time. It is desirable that as few callers as possible be disconnected without being served, while the percentage of agent busy time be kept as high as possible.

At step 202, the administrator enters initial estimates for the average dialing time per call and the average time spent by the agent per conversation. The average dialing time includes actual dialing time, plus the time spent waiting for an answer. These estimates may initially be provided using modelling data or estimates based on results from other installations. After the system is in use at an installation long enough to establish smooth operations, empirical data from the campaign may be used.

At step 204, the system counts the number of agents currently available to receive calls. At step 206, an initial estimate for the number of calls for the automatic dialer is computed based on the previously input parameters. The specific algorithm used is described below at step 214.

At step 208, with all initial parameters set, the system is ready to begin automatic dialing of calls. At step 210, the system is in a wait state until a state change occurs. At step 212, when any state change occurs, the number of active agents and the number of calls for the dialer are counted. The average dial time and the average conversation length are updated with the new results.

At step 214, the system employs its scheduling method to update the percentage of lost calls. Step 214 comprises detailed steps 222 through 234. The scheduling method is based on the same model and probability density function as in the system with a waiting queue, with one exception. The probability of having n calls in the system is zero for all n greater than S, the number of agents.

Steps 222 through 234 comprise a half interval technique for selecting maximum values for D, the number of active calls for the automatic dialer, and L, the time between automatically generated calls, given the remaining system parameters. At step 222, initial ranges are determined for D, setting minimum value at 0 and the maximum value at the number of agents. The initial value of D is set equal to the midpoint of the range. These values and the above equations are applied to determine the probability density function for the number of calls, P and the probability that the system is full. From these probabilities and the other values entered or collected at steps 202, 204, 206 and 212, the program calculates the expected number of calls; the expected number of busy agents; and the expected number of calls served.

At step 224, the range for D is reduced by half, to converge on the D value which satisfies the constraint on the minimum number of busy agents. The new range maximum is set to the old midpoint, if the required average number of busy agents is exceeded. The new range minimum is set to the old midpoint, if the required minimum number of busy agents is not met. At step 226, a convergence test for D is performed. Steps 222 through 226 are repeated until the difference in the range for D is unity. A final value for D is established if, in any iteration of the algorithm, the expected number of busy agents matches the desired minimum of busy agents.

At step 228, the minimum value of the range for L is set to the average dialing time, and the maximum value is set to M, the average length of a conversation. The probability density function is again computed. At step 230, new range endpoints are selected to reduce the range between minimum and maximum values of L.

At step 232, a test is made to determine whether the range for L has converged on a minimum value, for which the required agent busy time is met. If not, steps 228 and 230 are repeated until convergence is achieved. If the expected number of busy agents is found to match the minimum number of busy agents for any value of L, this value is selected as the final value.

At step 234, the final delay between calls is computed as the difference between the average dialing time and the original average dialing time. The percentage of lost calls is equal to the probability that the system is full and all agents are unavailable. The values for the desired minimum number of busy agents and the number of calls for the automatic dialer are provided.

At step 216, the current number of calls for the dialer 50 is counted and compared with the result of step 226. If the current value is different from the desired value, the necessary number of additional simultaneous calls for the dialer are activated or deactivated. At step 220, the system continues to dial new calls at a fixed interval, defined by L, and to update system parameters with each state change, in step 210.

Referring back to FIG. 1, in an alternative embodiment, each terminal 30 preferably includes an INTEL 80386 microprocessor, RAM, PROM, hard drive memory, and stored programs and databases including an ORACLE® database. Each terminal 30 is coupled to the LAN interface 70. Each telephone 42 is coupled through a computer port interface (CPI) link to lines 82 for communicating with the PBX 60 at 19,200 baud. The LAN interface 70 acts as a node controller and is preferably a personal computer having an INTEL 80386 microprocessor, 8 megabit (MB) RAM, and a 100 MB hard or fixed drive to support a plurality of terminals, for example, 24 terminals operating via the CSMA/CD protocol.

In another preferred embodiment, the dialer 50 includes an INTEL 80386 microprocessor, 4 MB RAM, and a 80 MB hard or fixed drive for storing programs including an operating system and the predictive dialing programs. The data source 10 in FIG. 1 includes a dialer database for storing names and target telephone numbers of parties to call, and an appointment database for storing names of parties and dates and times of appointments of parties, with the parties including persons or clients such as companies and organizations to be solicited or contacted for the telemarketing campaign.

Figure 5:
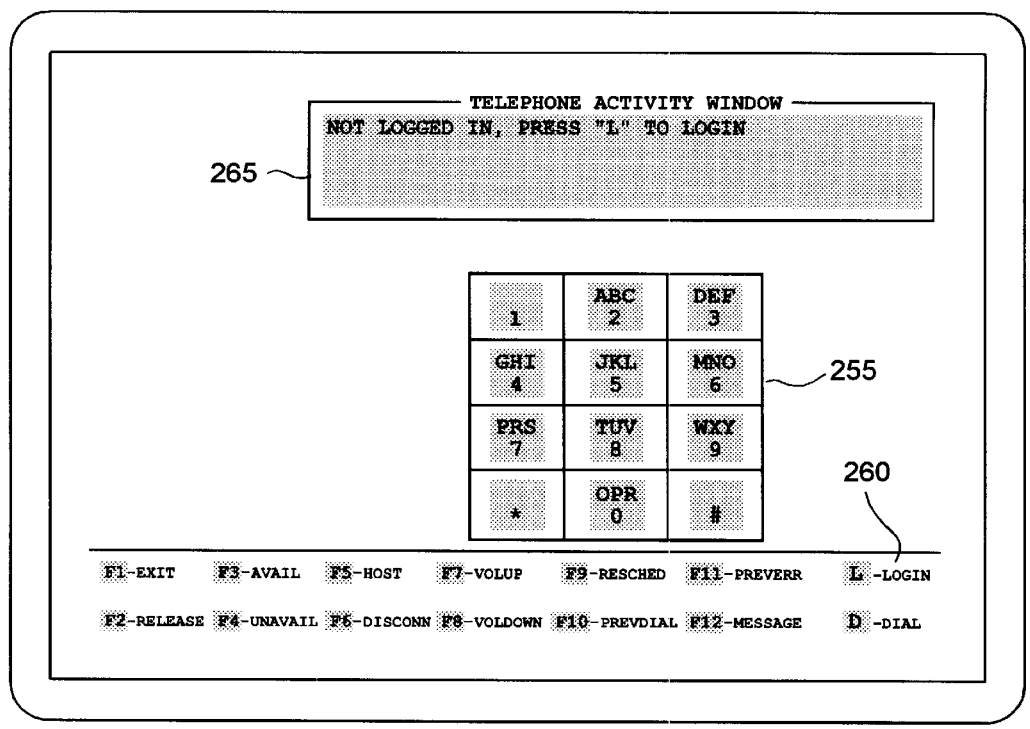
FIG. 5 shows an agent working screen.

In an alternative embodiment, as shown in FIG. 5, the server 20 includes a server memory storing agent, dialer, and appointment information in respective databases, a call queue, and an agent queue. The server memory also includes stored programs including the outbound and inbound call processing routines. In the alternative embodiment, the server 20 is preferably an INTEL 80486 based microprocessor system running the UNIX operating system and including a 1.2 gigabit (GB) memory to operate the predictive dialing system of the present invention.

The daily download to the server 20 at the beginning of each day from the data source 10 includes agent information having initial individual agent names, numbers, and designations as being inbound or outbound agents. Upon the server 20 receiving the downloaded information, telephone numbers are stored in the portion of the server memory holding the dialer information; the agent names, numbers, and initial inbound/outbound designations are stored in the memory holding the agent information; and the appointment data are stored in the appointment information area of the memory; so that no further interaction between the server 20 and the data source 10 is required for the remainder of the business day.

Figure 4:
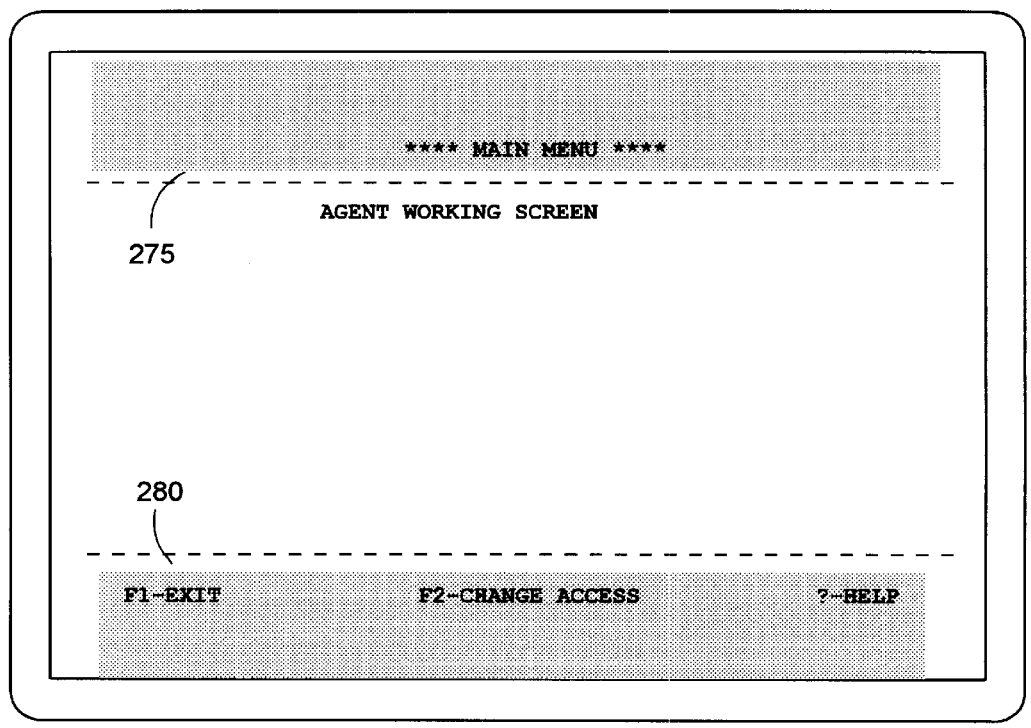
FIG. 4 shows an activity selection screen.

For both inbound and outbound calls and for all agents, both inbound and outbound, the apparatus according to the present invention provides each agent with on screen data on the displays of the agents' terminals for facilitating data entry by input screens. As shown in FIG. 4, a display screen displays an activity selection screen for data entry and for displaying additional windows, menus, or screens. A title bar 275 indicates a title or other screen information, and a command bar 280 displays available commands which may be executed through the input device 32. In response to a command from an agent, the display screen displays a telephone control screen, as shown in FIG. 5, having an on screen telephone keypad 255 and available commands 260 for use by the agent as a regular telephone. For example, depressing the F2 key puts the phone off hook and the F6 key controls the volume of the telephone speaker. A telephone activity window 265 may also be displayed to indicate telephone numbers input manually, agent log on and log off status, and other information relating to the telephone functions available to the agent. Outbound agents are assigned to campaigns and so are logged on to the server 20, while inbound agents address inbound calls independent of the outbound calls. Inbound agents, functioning apart from the outbound aspect of the campaigns, are not logged on to the server 20. Inbound callers, for example, may be parties who independently call seeking appointments or seeking to contribute or be involved with a campaign.

Figure 1A:
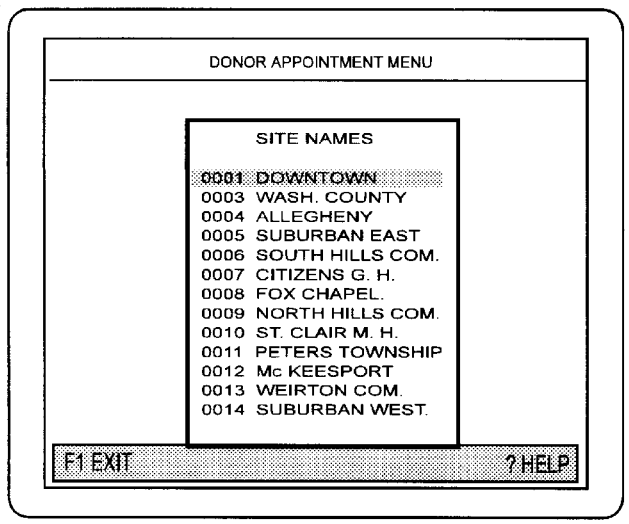
FIGS. 1a through 1c are screen format diagrams which illustrate scheduling means that may be displayed on the display device of the system shown in FIG. 1.
Figure 1B:
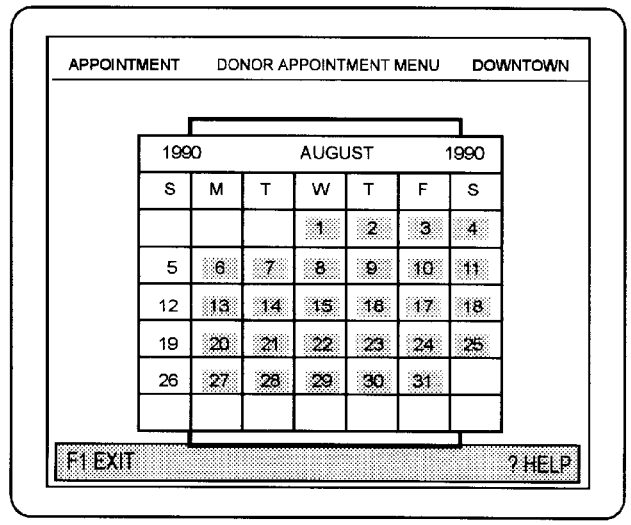
Figure 1C:
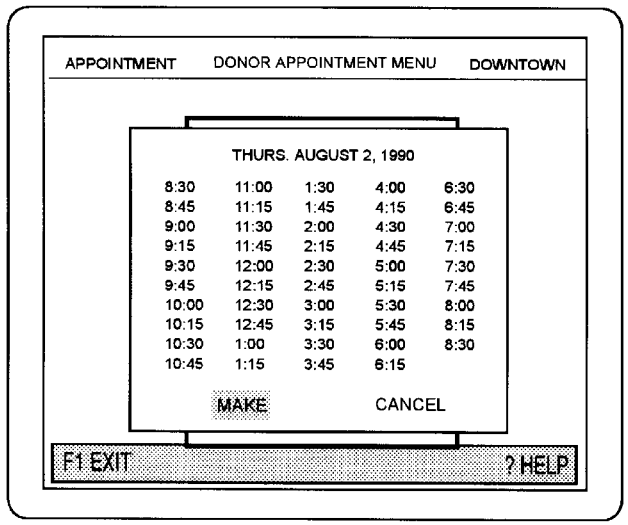

Referring back to FIGS. 1a–1c, the automated calendar function is used in conjunction with the appointment database in data source 10. As shown in FIGS. 1a–1c, each of the screens shown further includes a title bar indicating a title or other information about the displayed pop-up menu, and each of the screens may further include a command bar displaying available commands which may be executed through the input device 32.

In use, the predictive dialing system controls the predictive dialing as well as agent telephone functions. The outbound agents who have logged in for the day are each assigned a campaign attribute in the agent information area of the server memory, so that each outbound agent is only assigned outbound calls from a single campaign. When an outbound call is being transferred to an outbound agent, the server 20 is simultaneously transferring data records to the outbound agent's terminal 30. The terminal 30 displays called party information or dialer information; for example, names, addresses, and phone numbers, allowing the outbound agent to establish the identity of the called party before proceeding further with the outbound call.

After providing the called party's identity, the terminal 30 displays more detailed information on the display screen for processing the outbound call, and provides input fields into which the outbound agent may enter responses to predetermined questions via respective input device 32.

Inbound agents, however, may be employed for different duties than outbound agents in a campaign. In a telemarketing campaign, outbound agents, using dialer 50 to automatically dial outbound calls, are active; i.e. are pursuing new contacts for the campaign, while inbound agents, in addressing inbound calls, are passive or reactive to establish successful contacts for the campaign by uninitiated and random inbound calls. All agents, whether outbound or inbound, are capable of generating, editing, and canceling appointments with contacted parties using the calendar and appointment functions of the agents' respective terminals.

Figure 6A:
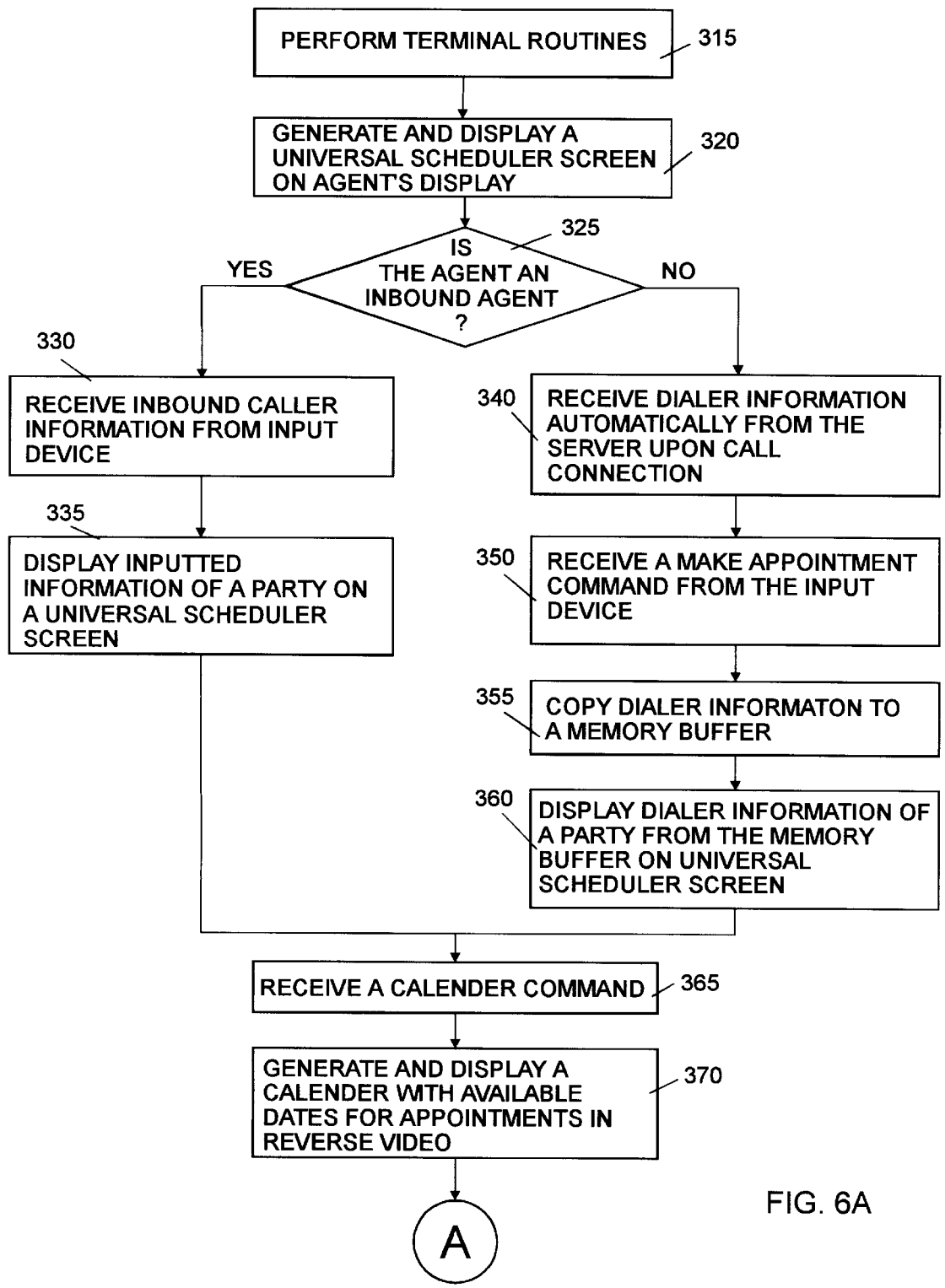
FIGS. 6A–6B show a flowchart of a method for making an appointment using calendar and appointment functions.
Figure 6B:
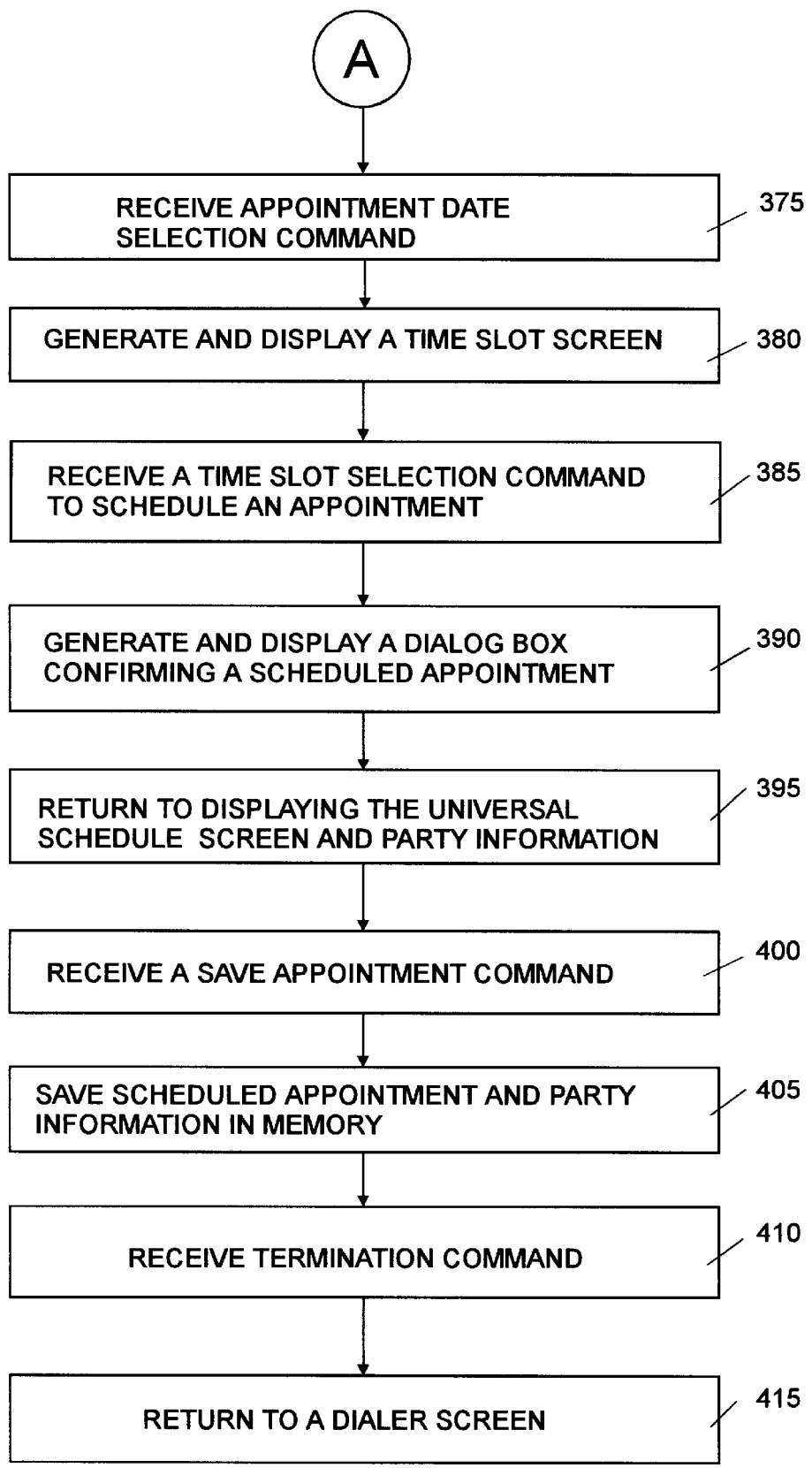

FIGS. 6A–6B illustrate a method of entering appointments. Each terminal 30 performs terminal routines in step 315, and displays an universal scheduler screen having blank areas for inputs on the display screen of an agent's terminal in step 320. If the agent is an inbound agent, as determined in step 325, the inbound agent's terminal 30 receives inbound caller information from the input device 32 by entry from the inbound agent in step 330. The information may be obtained from the inbound agent's conversation with the calling party. The terminal 30 displays the inputted caller information of the calling party in the blank areas of the universal scheduler screen in step 335.

If the agent is determined in step 325 to be an outbound agent, the outbound agent's terminal 30 receives dialer information automatically from the dialer information area of the server memory upon connection of the outbound call to the called party in step 340. Upon the outbound agent eliciting the called party to agree to make an appointment, the outbound agent enters a MAKE APPOINTMENT command at the input device 32 at step 350. In response to the MAKE APPOINTMENT command, the terminal 30 copies the dialer information received from the server 20 to a memory buffer in the memory of terminal 30 in step 355, and the terminal 30 displays automatically the dialer information of the called party from the memory buffer in the blank areas of the universal scheduler screen in step 360.

With the party information or dialer information on display to the agent, whether inbound or outbound, the agent's terminal 30 may receive a calendar command in step 365 from the agent's input device 32, and the agent's terminal 30 generates and displays a calendar with available dates for appointments, preferably, in reverse video in step 370. See, for example, the calendar shown in FIG. 1b. The terminal 30 receives an appointment date selection command from the agent through input device 32 in step 375, and generates and displays a time slot screen in step 380, such as the time slot pop-up menu in FIG. 1b.

The terminal 30 then receives a time slot selection command to schedule an appointment in step 385, and generates and displays a dialog box in step 390 confirming a scheduled appointment by displaying a selected date and time in a box or window on the display. The terminal 30 returns in step 395 to display the universal scheduler screen and party information, and may receive a SAVE APPOINTMENT command from input device 32 in step 400. In response to the SAVE APPOINTMENT command, the terminal 30 saves the scheduled appointment and party information in the appointment information area of terminal memory. This information may be uploaded to the data source 10 at the end of the campaign day to update the appointment and party information in the data source 10 for subsequent downloading from the data source 10 to the server 20 on the next campaign day. The terminal 30 may then receive a termination command in step 410 to terminate the calendar command, and the terminal 30 returns to a dialer screen in step 415, such as an agent activity screen as shown in FIG. 4. Each agent may also delete or reschedule appointments in the server memory.

As appointments are made, edited, or cancelled by agents, the server 20 updates the appointment information in the appointment database in the server memory. The server 20 may also perform at least one download of the updated appointment information to the dialer 50 during the campaign day. The predictive dialing system may also remind agents of scheduled appointments for a campaign day. At the beginning of each campaign day, the download of appointment information from the appointment database of the data source 10 to the server 20 also includes a file for use by the server 20 to generate a reminder of upcoming appointments of parties with the appropriate agents.

Figure 7:
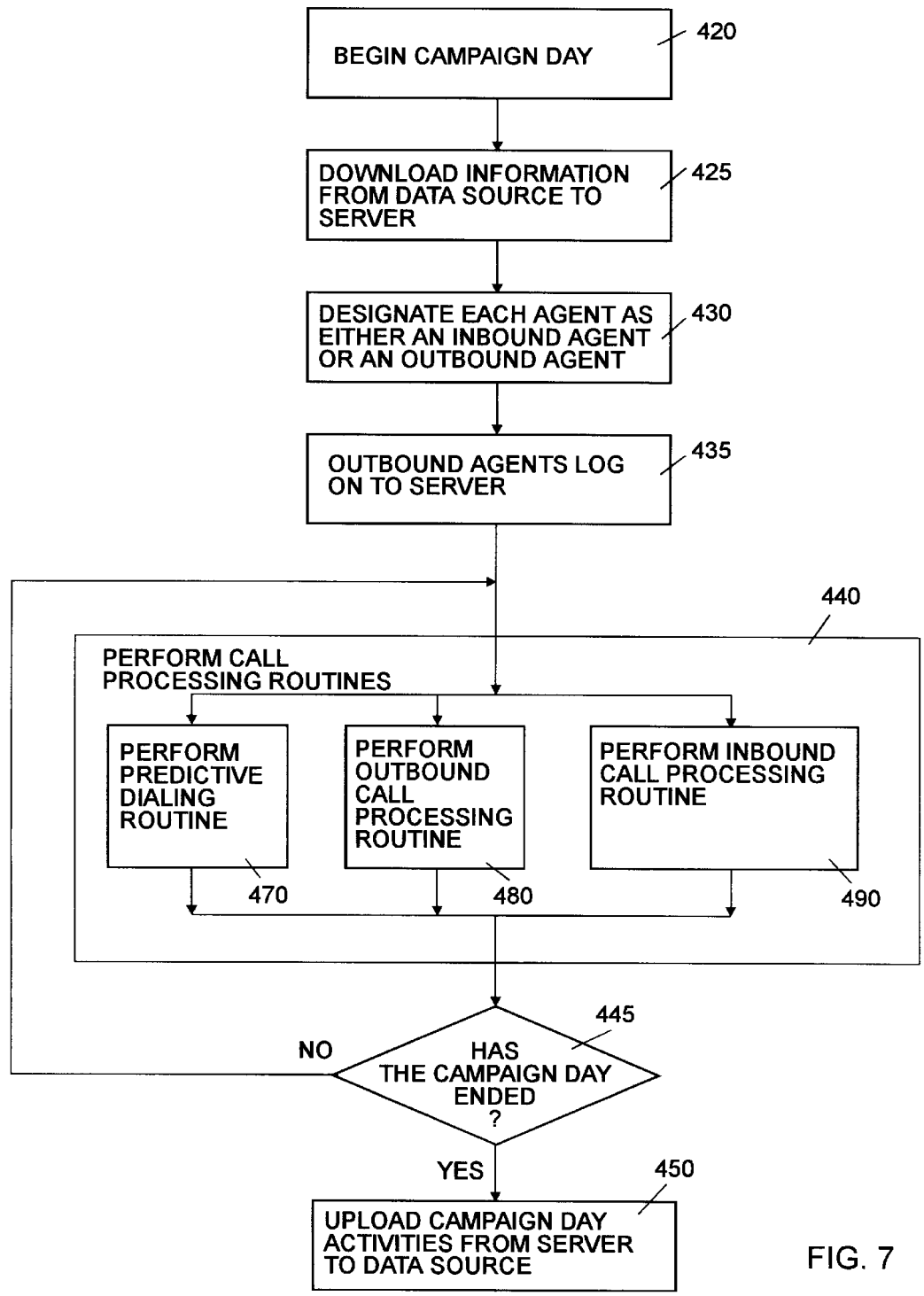
FIG. 7 shows a flowchart of a method for controlling a campaign using the present invention.

According to an alternative embodiment, the predictive dialing system of the present invention employs a method as shown in FIG. 7 for controlling and conducting a campaign, day to day, for a scheduled or specified duration of time, such as a few weeks or months, by daily beginning a campaign day in step 420, downloading information such as dialer information and appointment information from the data source 10 to the server 20 in step 425, designating each agent in step 430 as either an inbound agent or an outbound agent in the agent database of the server memory, having the outbound agents at the beginning of the campaign day log on to the server 20 in step 435, performing call processing routines in step 440, continuing in the step 445 to perform step 440 if the campaign day has not ended, and uploading the campaign day activities from the server 20 to the data source in step 450, including changes in the appointment database by the making, editing, or canceling of appointments during the campaign day.

The performing of call processing routines in step 440 includes, as illustrated in FIG. 7, the performance of a predictive dialing routine in step 470 concurrent with the performance of an outbound call processing routine in step 480 concurrent with the performance of an inbound call processing routine in step 490 such as to convert outbound agents to inbound agents to address inbound calls. Briefly, the predictive dialing routine in step 470 controls the automatic dialing of outbound calls by the dialer 50, the outbound call processing routine in step 480 connects available outbound agents to the outbound calls, and the inbound call processing routine in step 490 converts outbound agents to inbound agents when needed and connects available inbound agents to inbound calls. Steps 470–490 are performed concurrently by the predictive dialing system of the present invention, as inbound and outbound calls occur concurrently during each campaign day, and the predictive dialing methods of the present invention update the scheduling and dialing of outbound calls during the campaign day as the inbound and outbound agents address calls in the campaign.

Figure 3A:
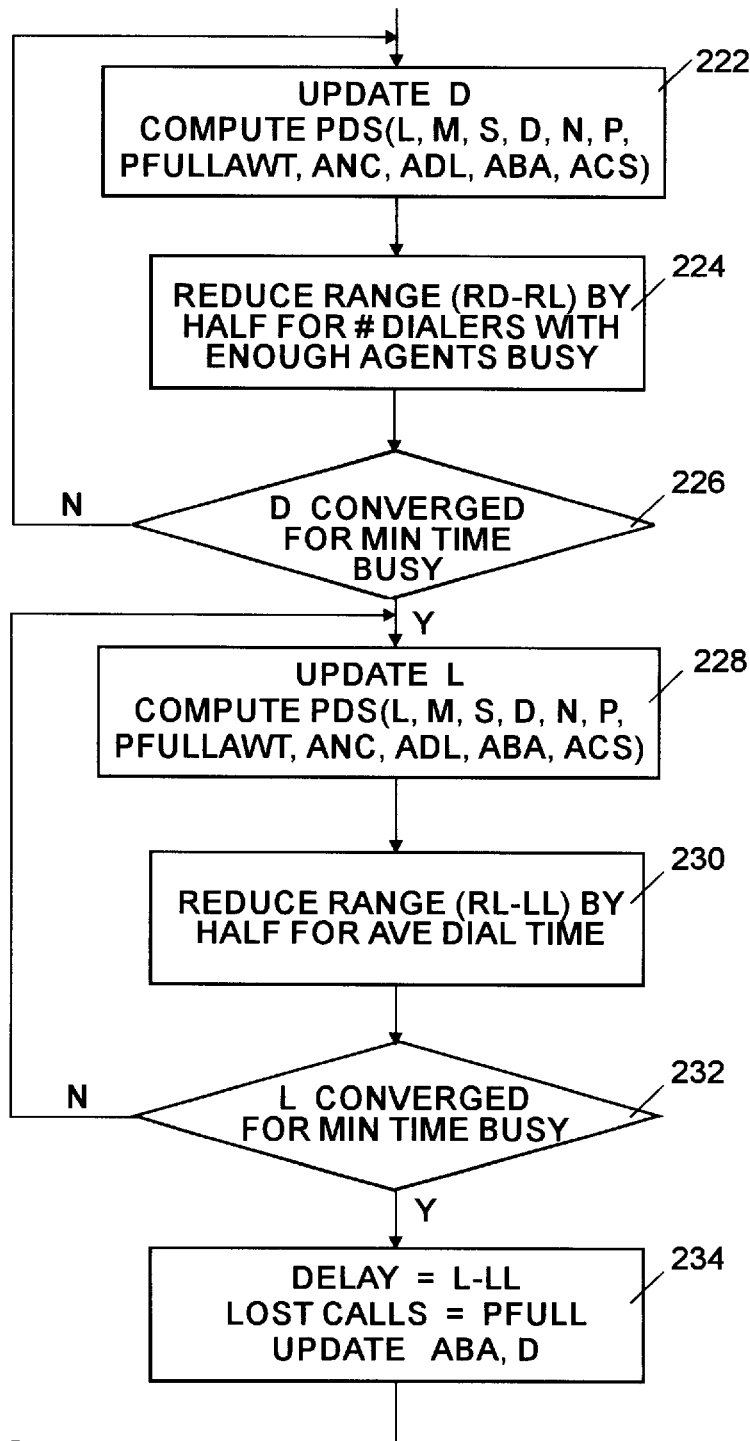
Figure 8:
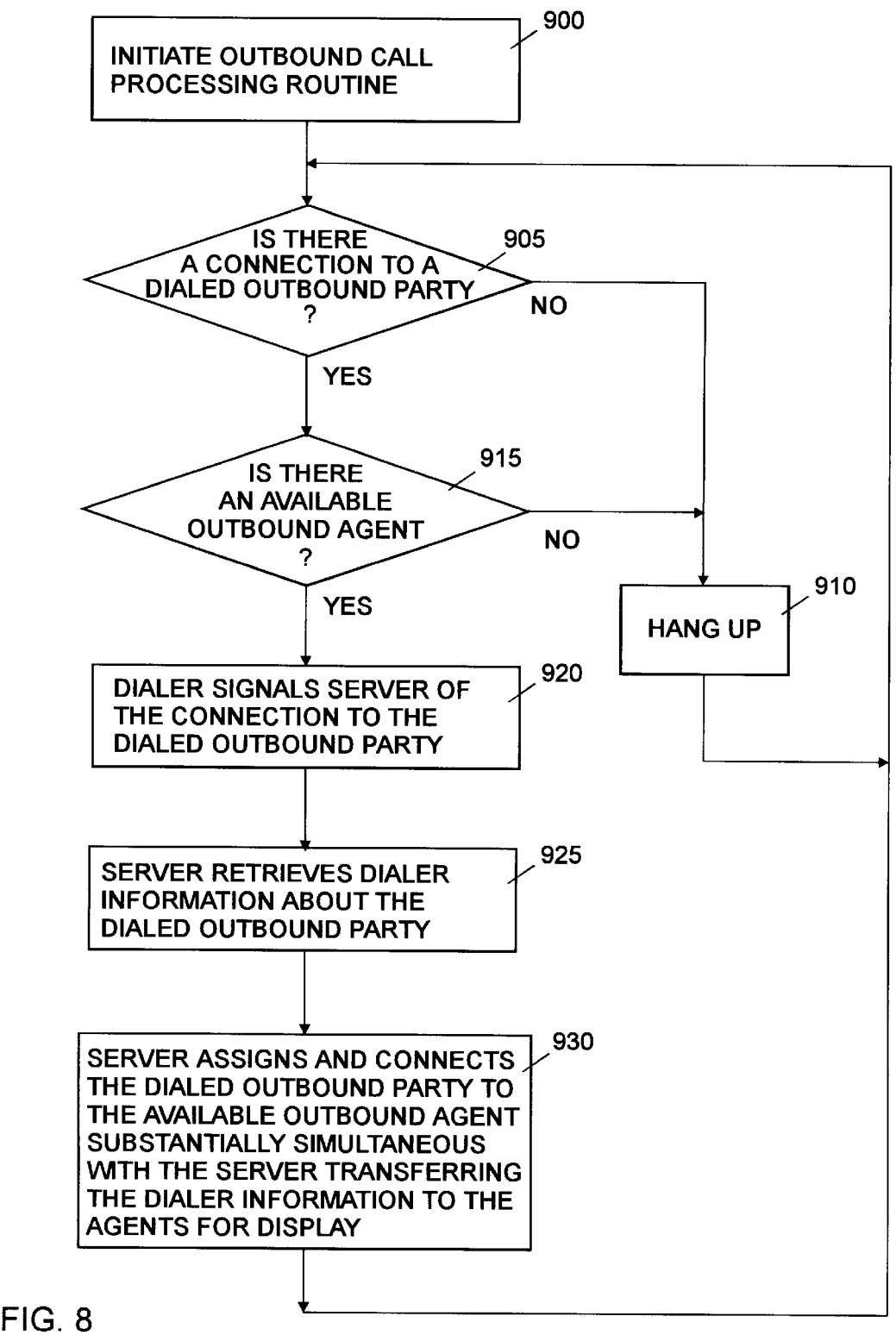
FIG. 8 shows an outbound call processing routine.

FIGS. 2 to 3*a* as described above illustrate the predictive dialing routine for outbound calls. Further outbound call processing is shown in step 480 of FIG. 7 and further in FIG. 8. As shown in FIG. 8, the outbound call processing routine is initiated in step 900 by checking for a connection to a dialed outbound party in step 905, hanging up in step 910 if there is no connection, and continuing to check and wait for a connection to a dialed party in step 905. If a connection to a dialed outbound party is detected, the outbound call processing routine checks for an available outbound agent in step 915. If no available outbound agent is detected, the outbound call processing routine hangs up in step 910 so that the connected dialed outbound party is not held on the line waiting for an outbound agent.

If an outbound agent is detected to be available in step 915, the dialer 50 signals the server 20 of the connection of the predictive dialing system to the dialed outbound party in step 920, the server 20 retrieves in step 925 the dialer information about the dialed outbound party from the dialer database in the server memory. The server 20, in step 930, assigns and connects the dialed outbound party to the workstation of the available outbound agent, with the assigning and connecting substantially simultaneous with the server 20 transferring the dialer information to the terminal 30 for display. Since a number of outbound agents may be working simultaneously during the campaign, the outbound call processing routine in FIG. 8, after step 930, returns to step 905 to check if the predictive dialing system of the present invention has concurrently established additional connections to dialed outbound parties.

Figure 9:
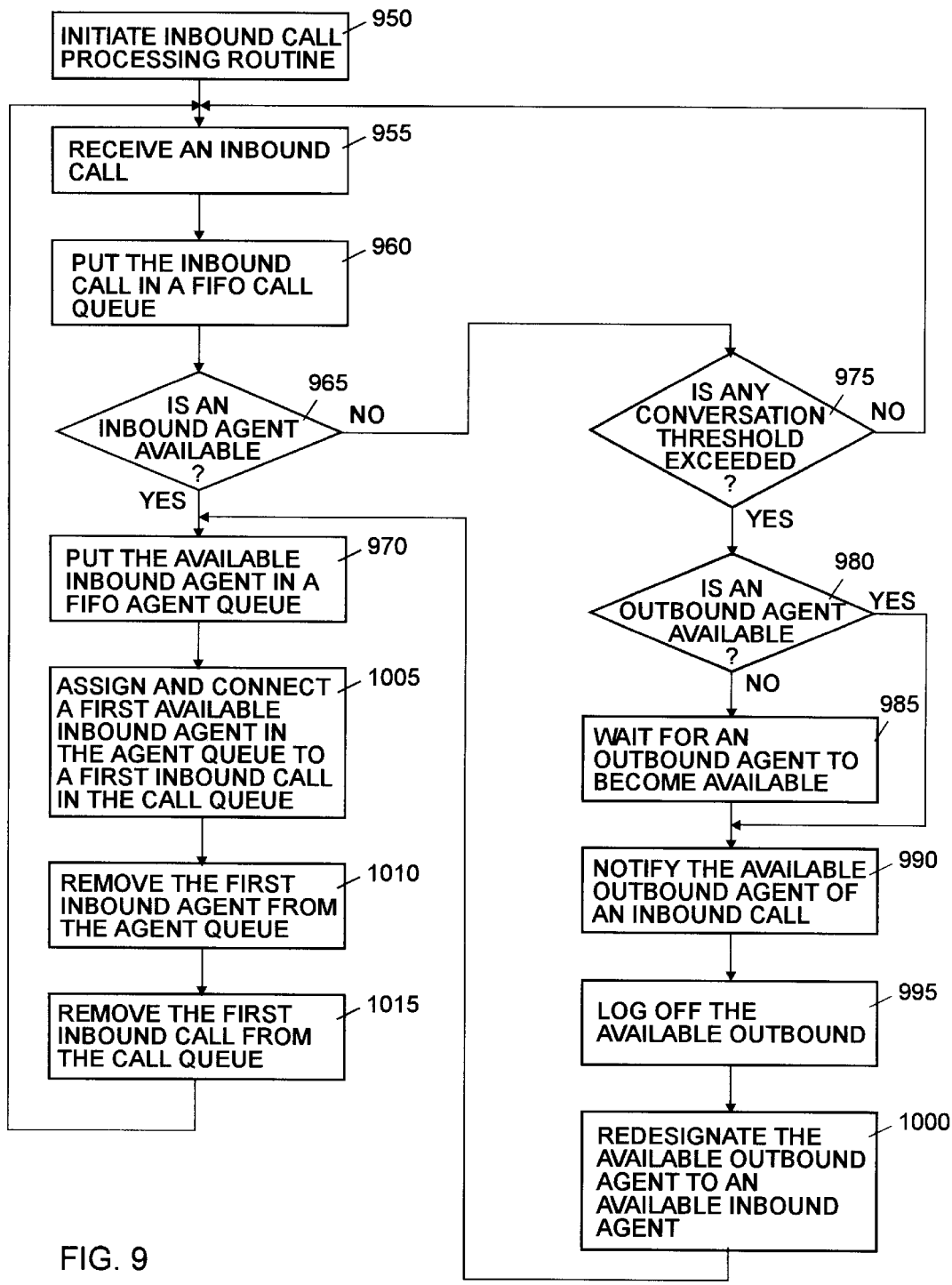
FIG. 9 shows an inbound call processing routine.

The performing of the inbound call processing routine in step 490 in FIG. 7 may includes the steps, as shown in FIG. 9, of initiating the inbound call processing routine in step 950, receiving an inbound call in step 955, putting the inbound call in an inbound call queue in step 960, checking if an inbound agent is available in step 965, and putting the available inbound agent in the inbound agent queue in step 970. If no inbound agents are available in step 965, at least one conversion threshold is checked in step 975 to see if the at least one conversion threshold is exceeded. If no conversion threshold is exceeded in step 975, the inbound call remains in the inbound call queue and the inbound call processing routine loops backs to continue to receive inbound calls in step 955. However, if at least one conversion threshold is exceeded in step 975, the inbound call processing routine checks in step 980 if an outbound agent is available. If an outbound agent is available in step 980, the available outbound agent is notified in step 990 of an inbound call in the inbound call queue; otherwise, if no outbound agent is available in step 980, the inbound call processing routine waits in step 985 for an outbound agent to become available, and then notifies the available outbound agent in step 990 of the inbound call in the inbound call queue.

The server 20, running the inbound call processing routine, automatically logs off the notified available outbound agent in step 995, redesignates the available outbound agent to be a new available inbound agent in step 1000, and puts the new available inbound agent in the inbound agent queue in step 970. The redesignating of an outbound agent to an inbound agent in step 1000 is noted in the agent database in the server memory. A redesignated inbound agent is indistinguishable from any other inbound agent, as all agents in the campaign use the same terminals of the predictive dialing system.

Preferably, after an available inbound agent is put in the inbound agent queue in step 970, the inbound call processing routine assigns and connects, on step 1005, a first available inbound agent in the inbound agent queue to a first inbound call in the inbound call queue, removes the first inbound agent from the inbound agent queue in step 1010, removes the first inbound call from the inbound call queue in step 1015, and loops back to receive an inbound call in step 955.

Figure 10:
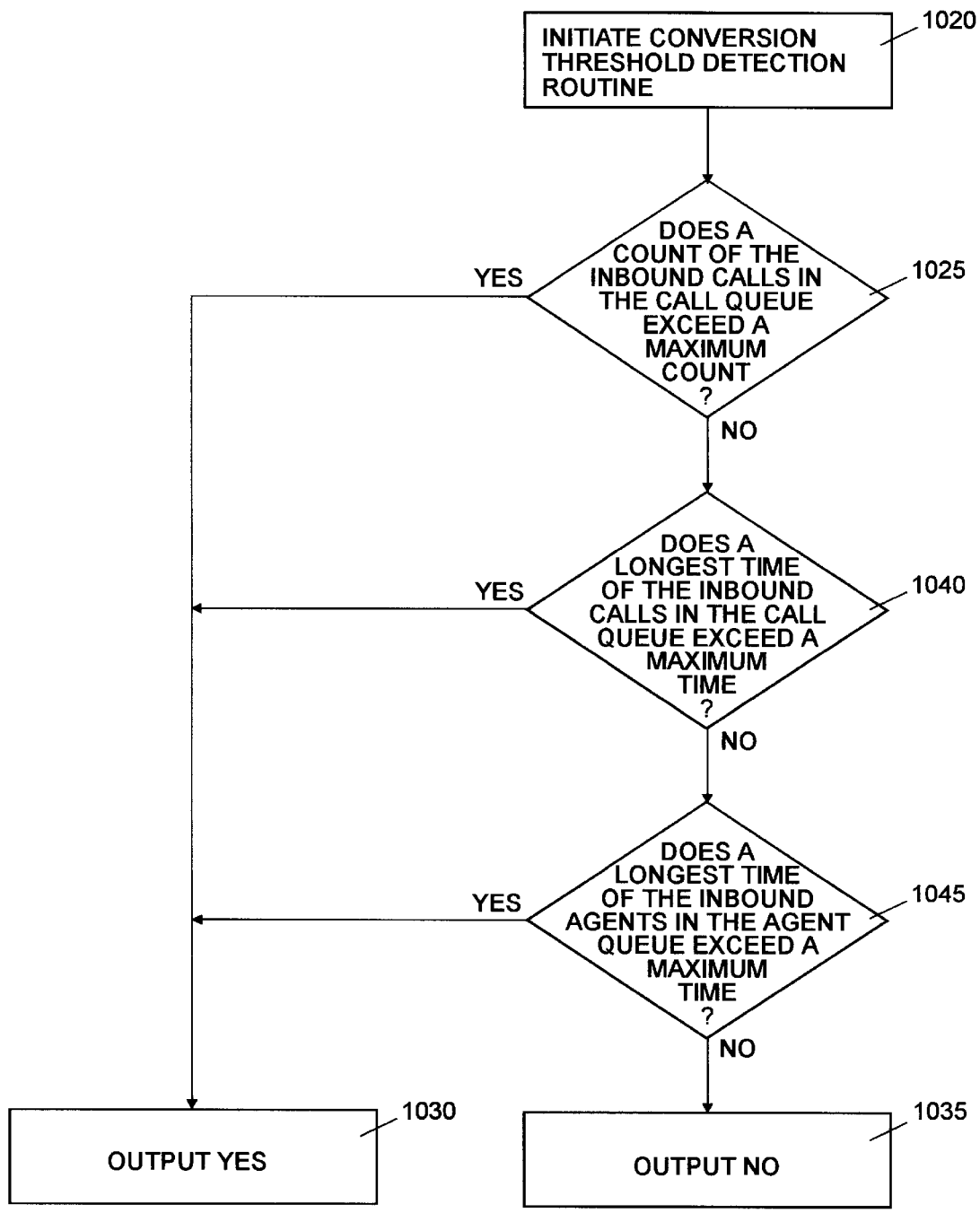
FIG. 10 illustrates a conversion threshold detection routines used in the inbound call processing routine.

The inbound call processing routine in FIG. 9 connects inbound agents to inbound calls, and converts outbound agents to inbound agents to address inbound calls as needed, with the need determined by the exceeding of a conversion threshold in step 975. The checking of an exceeding of a conversion threshold in step 975 may include any of the threshold routines in FIG. 10. The conversion threshold detection routine as shown in FIG. 10 includes the steps of initialization in step 1020 and detection for a count of the inbound calls in the inbound call queue exceeding a maximum count in step 1025.

If the inbound call count does not exceed a maximum, and if the duration of any of the inbound calls in the inbound call queue exceeds a preset maximum time, a threshold condition exists (step 1040). If the longest time of inbound calls does not exceed the maximum time, but the duration of an inbound agent in the inbound agent queue exceeds a maximum time, another threshold condition exists (step 1045). If no threshold condition is detected, the inbound call processing routine outputs NO in step 1035; however, if any of steps 1025, 1040, 1045 has any of the thresholds detected to exceed the corresponding maximum, a YES is output in step 1030. It is apparent to one skilled in the art that steps 1025, 1040, 1045 may be performed in any order for detecting a conversion condition.

To set up the predictive dialing system for a campaign or to modify the operation of the campaign anytime during the campaign, a system administrator accesses a system administration program in the server memory by entering an administrator password. Upon a grant of access by the server 20, the system administrator may input and change predictive dialing system parameters and agent information in a campaign profile, i.e. a set of parameters of the campaign, using a Campaign Parameter Profile screen, as shown in FIG. 11. The Campaign Parameter Profile screen allows the system administrator to control the predictive aspect, or aggressiveness, of each campaign. Other aspects controllable by the system administrator include whether the campaign is to use preview dialing, and how the dialer is to handle no-agent available calls, ring-no-answer calls, busy line calls, answering machine calls, etc. The information on the Campaign Parameter Profile screen is displayed and controllable by the system administrator as follows:

CAMPAIGN NUMBER—This is a number assigned to a campaign to which the data entered by the system administrator in the campaign parameter profile screen applies. The campaign number uses two digits; for example, numbers in the range 01–14. To update an existing campaign parameter profile for a campaign, the system administrator enters the two-digit number of the campaign. For a new campaign profile, a default Campaign Parameter Profile screen appears with blank spaces for data entry or with default settings to be reviewed and changed by the system administrator. For an existing campaign profile, the last saved information appears. Upon entering a campaign number, the campaign number appears on the campaign parameter profile screen.

PREVIEW DIALING ENABLED—Preview Dialing allows an outbound agent to see the call record or dialer information for the person to be called before the outbound call is placed. Entering a Y for YES sends the call record to an available outbound agent's screen before the outbound call is dialed. Entering an N for No allows the outbound call to be dialed, and then when the predictive dialing system detects a live answer, both the outbound call and the call record are sent to an available outbound agent.

MAXIMUM PERCENT ABANDONED CALLS—This entry specifies a percentage of abandoned outbound calls or system disconnects that is allowed. When the predictive dialing system dials ahead, sometimes a situation arises when two or more connects are made when only one outbound agent is available. Any extra outbound calls are disconnected and the call records of the disconnected extra outbound calls are placed in a no agent re-dial queue stored and maintained in the call queue in the server memory. Note that the called party hears nothing. A higher percentage results in a greater possibility that outbound calls are disconnected by the predictive dialing system. If the percentage is too low, however, the predictive dialing system does not dial as aggressively. Typically, between 5 and 10 percent is entered.

MINIMUM AGENTS FOR DIAL-AHEAD—This entry specifies the minimum number of logged-in and available outbound agents assigned to the campaign having the entered campaign number described above before the dialer 50 dials ahead, on the expectation that, when an outbound call is answered, an outbound agent is available to take the outbound call. If fewer outbound agents than this number are logged in and available to this campaign, the predictive dialing system waits to dial out until more outbound agents become available. A higher number means better performance of the predictive dialing system. A whole number is to be entered. Typically, 5 or 6 is entered, depending upon the number of outbound agents that are typically expected to be logged in.

AVERAGE AGENT WAIT TIME—This entry specifies a target breathing time or quiet time between outbound calls in seconds. The predictive dialing system attempts to maintain this average length of time between outbound calls. A typical entry may range from 14 to 20 seconds. A minimum of 5 seconds and a maximum of 99 seconds may be entered.

MAXIMUM RE-DIALS—This entry specifies the number of dialing attempts that are to be allowed for contacting an individual or a party such as a corporation or organization. This entry only applies to a particular dialing session for the campaign; i.e. until the campaign is suspended or stopped. When resuming the dialing session on the following day, the predictive dialing system assumes that an individual has not been called previously and starts counting from zero. A whole number is to be entered. Typically, a number between 3 and 5 is entered. There is also a maximum limit on the number of re-dials that applies to the call records' lifespan on the predictive dialing system. This limit is defined during campaign definition.

BUSY RESCHEDULE TIME—This entry specifies the time, in hours and minutes, that the predictive dialing system waits before re-dialing a call record that returned a busy signal. Typically, 15 minutes is entered since a busy signal usually indicates that the called party is home.

NO-CONNECT RESCHEDULE TIME—This entry specifies the time, in hours and minutes, that the predictive dialing system waits before re-dialing a call record that was not connected because of a no-dial tone condition errors. Typically, this entry is between 30 and 40 minutes.

NO-AGENT RESCHEDULE TIME—This entry specifies the time, in hours and minutes, that the predictive dialing system waits before re-dialing an outbound call that has been disconnected because of a no-agent condition. Typically, a minimum of 45 minutes is entered here. This provides sufficient time to elapse between the hang-up and the new outbound call.

RING-NO-ANSWER RESCHEDULE TIME—This entry specifies the time, in hours and minutes, that the predictive dialing system waits before re-dialing a call record that did not answer. Typically, this entry is between 1 and 4 hours.

PASS OPERATOR INTERCEPT—This entry specifies what action is to be taken when the dialer detects a network intercept message; e.g. special information tone. Entering N for NO sends the call record to a no connect re-dial queue. Enter Y for YES sends the outbound call to an outbound agent so that the outbound agent may listen to the message and update the call record accordingly.

PASS ANSWERING MACHINE—This entry specifies what action is to be taken by the predictive dialing system when the dialer detects an answering machine. Entering a Y for YES sends the outbound call to an outbound agent. Entering an N for NO sends the outbound call record to a no answer re-dial queue.

CAMPAIGN DIAL SELECTION—These entries specify when and to where outbound calls are placed. As shown in FIG. 11, the chart in the lower half of the Campaign Parameter Profile screen lists 24 hours in half-hour increments for the seven days in a week. The times are given in military time; i.e. 2:00 p.m. is shown as 14, 8:00 p.m. as 20, etc. For each day of the week entries indicate where and when outbound calls should be dialed. There are four possible entries for each half-hour time period, specifically:

B for business number of parties to call;
H for home number of parties to call;
Y for either home or business number; and
N for no dialing.

Typically, outbound calls are placed Monday through Saturday from 8:00 a.m. to 9:00 p.m.

In addition, corrections for different time zones and for daylight savings time are provided for the predictive dialing system. For example, if the Campaign Parameter Profile specifies no calls until 10:00 AM, the predictive dialing system of the present invention installed in New York waits until it is 10:00 AM in California before dialing outbound calls to areas codes in California.

Figure 12:
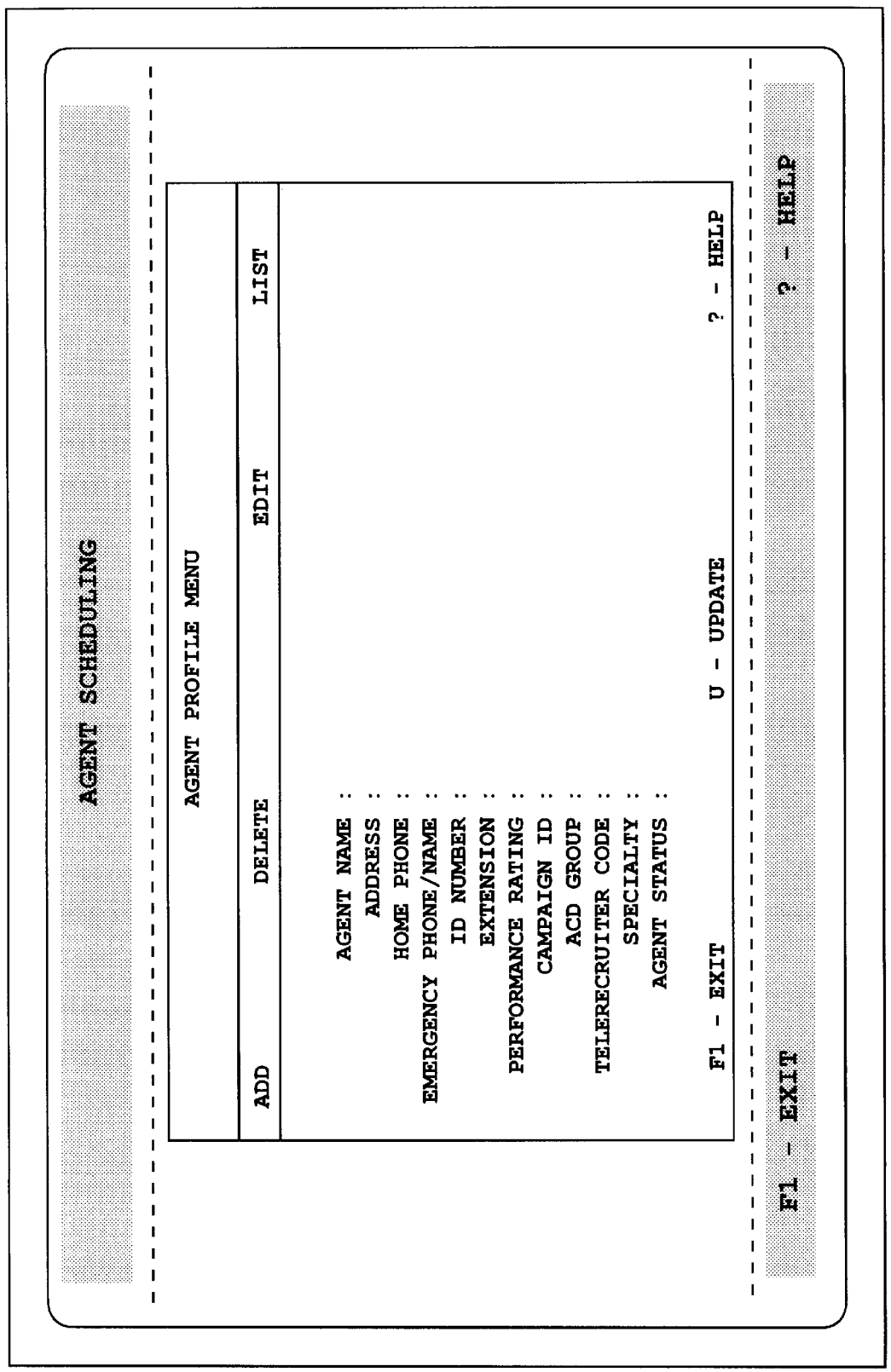
FIG. 12 shows an Agent Profile screen.

For agent scheduling, the Agent Profile screen as shown in FIG. 12 allows the system administrator to setup agents in the predictive dialing system. Using the Agent Profile screen, the system administrator may identify each agent to the system by name and agent number, as well as provide information about each agent to authorized administrators. Every user of the predictive dialing system is setup in the system via the Agent Profile screen before they are able to log on.

Upon being accessed by an Agent Profile Screen command, a blank Agent Profile screen appears with four choices available:

ADD for creating an agent profile;
DELETE for deleting an agent profile;
EDIT for updating an existing agent profile; and
LIST for listing all agent profiles in an abbreviated format.

For each user the following six items may be entered: Agent Name; Agent Number from 1 to 129; Agent Status, which specifies each agent as either inbound (I) or outbound (O) at the beginning of the campaign day; Campaign Identification (ID) number, which is a campaign number that the agent is assigned to work on, and the agent may be reassigned by the system administrator to a different campaign using a Reassign Agent command; ACD Group, with agents grouped in automatic call distribution (ACD) groups with each ACD group assigned an ACD group number to be entered in this field; and Telerecruiter Code, a 10 digit number assigned to each agent that is unique. The Telerecruiter code is used for personnel identification functions.

Figure 13:
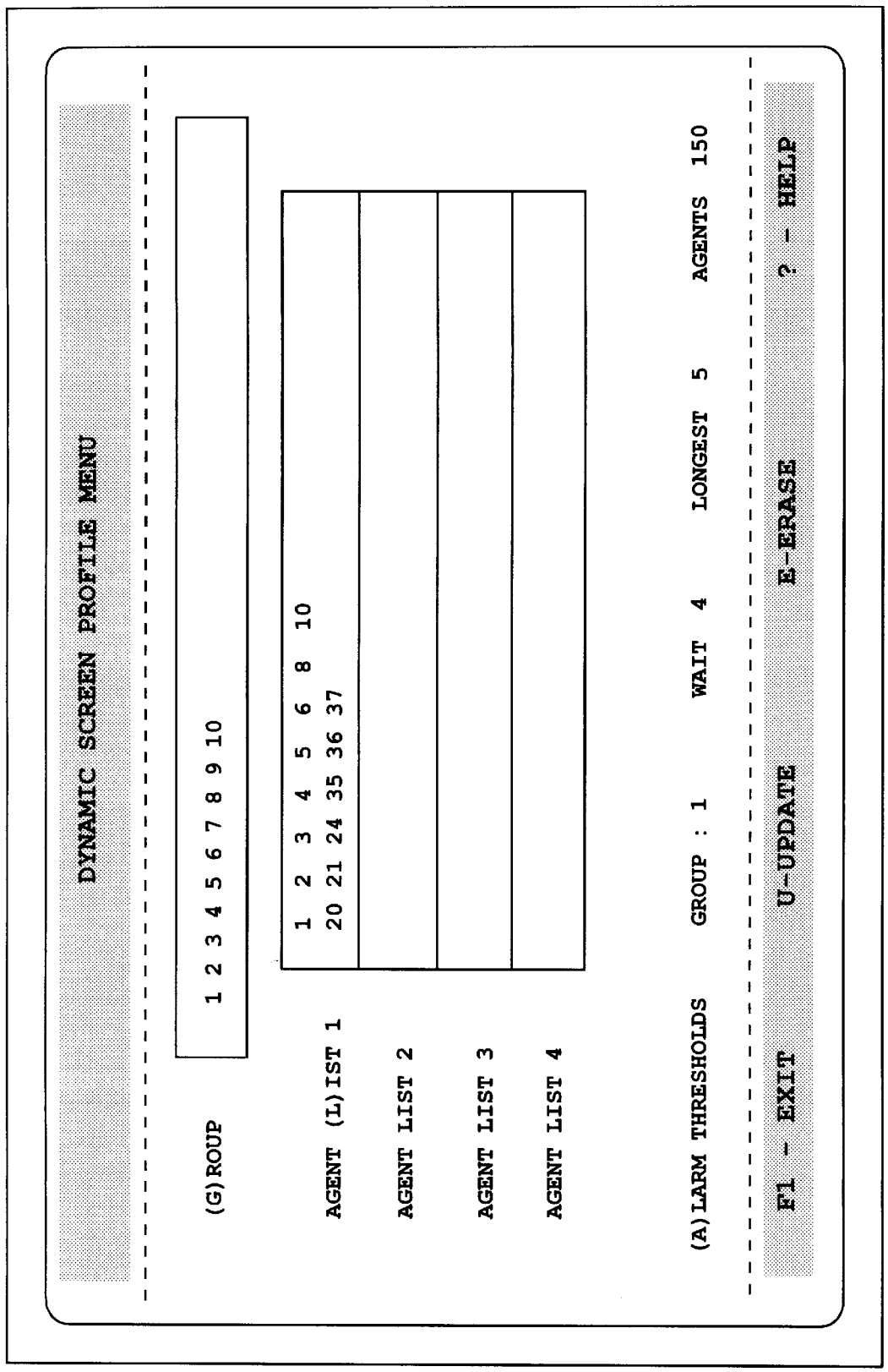
FIG. 13 shows a Dynamic Screen Profile Edit screen.

For reviewing and modifying campaigns during the campaign day, a Dynamic Screen Profile Edit command menu allows the system administrator to choose which campaigns are displayed on the Dynamic Screen, and which agent groups are displayed when agent groups are chosen on the Dynamic Screen. FIG. 13 shows the Dynamic Screen Profile Edit screen. The Dynamic Screen Profile Edit screen is divided into three sections: a Campaign Group section shown as GROUP, Agent Group sections shown as AGENT LISTS 1–4; and an Alarm Threshold section.

The Campaign Group section allows the system administrator to list all the campaigns that need to be displayed on the right side of the Dynamic Screen. Campaign numbers may be added or deleted as necessary, and the numbers may be in any order. The campaigns may be displayed in numerical order on the Dynamic Screen.

Each of the Agent Group sections allows the system administrator to assign agents to any of the agent groups. A predetermined maximum number of agent, for example, 24 agents may be placed in an agent group. The agents may be entered in any order and may be displayed in numerical order on the Dynamic Screen. Using the Agent Working Screen as shown in FIG. 4, a system administrator may also process calls at their terminal in the same manner as an agent processes calls at the agents' terminals.

The present invention may also include a Silent Monitor feature. As a system administration feature only, Silent Monitor allows the system administrator to listen to a conversation in progress between an agent and another party without being part of the conversation with a telephone microphone of the system administrator off, so that loud noises in the vicinity of the system administrator are not heard. To use Silent Monitor, the user presses a silent monitor command on the telephone or at input device 32 and dials the extension number of the agent to be monitored.

The predictive dialing system according to the present invention further includes stored programs for compiling and reporting statistics gathered from the predictive dialing activities. For example, percentages of successful outbound calls; the number of redesignations of outbound agents to inbound agents; the performance of each agent relating to the number of appointments made; the costs involved for outbound calls for each campaign; and the success percentage per geographic region may be provided.

While the invention has been particularly shown and described with reference to the preferred embodiments, it will be understood by those skilled in the art that various modifications in form and detail may be made therein without departing from the scope and spirit of the invention. Accordingly, modifications such as those suggested above, but not limited thereto, are to be considered within the scope of the invention.

We claim:

1. A telephone system providing appointment scheduling having a private branch exchange (PBX) for connecting a plurality of telephone stations to a telephone line, each of said telephone stations being assigned to one of a plurality of agents, the telephone system comprising:

a processing unit including:
associated memory and stored programs for storing appointment information, the appointment information including appointment entries having dates and times, for monitoring outbound and inbound calls and for storing therein a current status of each agent as being either an inbound agent or an outbound agent;
detecting means for detecting an inbound threshold condition signifying the need for redesignating in the memory an available outbound agent as an inbound agent for answering an inbound call;
notifying means for notifying the available outbound agent of the inbound call prior to redesignation;
redesignating means for redesignating in the memory the current status of the available outbound agent as an inbound agent; and
assigning means for assigning and connecting the available outbound agent having its current status redesignated in the memory as an inbound agent for answering the inbound call; and
each of the plurality of telephone stations including:
a voice communication device for facilitating voice communications by said respective one of said plurality of agents with an inbound or outbound call connected thereto through said telephone line;
a display;
an input device; and
a processor responsive to input signals representing commands for execution by said processor, including a call data command, a calendar command and an appointment command, from the respective input device, the processor responsive to the appointment command for generating and storing a plurality of appointment entries, the processor responsive to the calendar command for generating a calendar screen on the respective display of the respective telephone station and for generating and editing the appointment information in the associated memory, and the processor responsive to the call data command for displaying data relating to inbound and outbound calls originating from and connected to the respective agent.

2. The system of claim 1 wherein said display further displays telephone keypad and functions keys for selection of telephone functions including flash and off-hook by said respective agent with said input device.

3. A telephone system for dynamic inbound and outbound call management having a private branch exchange (PBX)

for connecting a plurality of agent stations to at least one telephone line, each of said agent stations being assigned to a respective one of a plurality of agents, and a dialer for automatically routing an outbound call, the telephone system comprising:

(a) a processing unit including:
associated memory and stored programs for monitoring outbound and inbound calls and for storing therein a current status of each agent as being either an inbound agent or an outbound agent;
designating means for designating in the memory the current status of each of the plurality of agents as either an inbound agent or an outbound agent;
detecting means for detecting an inbound threshold condition signifying the need for redesignating in the memory an available outbound agent as an inbound agent for answering an inbound call;
notifying means for notifying the available outbound agent of the inbound call prior to redesignation;
redesignating means for redesignating in the memory the current status of the available outbound agent as an inbound agent; and
assigning means for assigning and connecting the available outbound agent having its current status redesignated in the memory as an inbound agent for answering the inbound call; and (b) each of said agent stations including:
a voice communication device for facilitating voice communications by said respective one of said plurality of agents with an inbound or outbound call connected thereto through said telephone line;
an agent processor and associated display for displaying data relating to inbound or outbound call including said current status of said respective agent, record data of the party of said inbound or outbound call connected to said respective agent stations, and input fields into which said respective agent enters data associated with said inbound or outbound call; and
an input device associated with said display for facilitating entering of said data into said input fields.

4. The telephone system as set forth in claim 3 further comprising:
queue means for generating a queue; and
threshold means, responsive to an inbound threshold condition of the queue, for generating a threshold signal.

5. The telephone system as set forth in claim 4 further comprising:
access means for logging on at least one of the plurality of agents to the telephone system and for logging off at least one of the plurality of agents from the telephone system, the access means, responsive to the threshold signal, for logging off a first outbound agent.

6. The telephone system as set forth in claim 5 further including:
the detecting means, responsive to the access means logging off the first outbound agent in response to the threshold signal, for detecting that the logged off first outbound agent is available to answer the inbound call as the available outbound agent; and
the designating means for designating the logged off first outbound agent as an inbound agent.

7. The telephone system as set forth in claim 3 further comprising:
the associated memory for storing appointment information, the appointment information including dates and times of appointments; and each of the plurality of telephone stations including:
a display;
an input device; and
a processor responsive to input signals, including a calendar command, from the respective input device for generating a calendar screen including a graphic of a month on the respective display of the respective telephone station.

8. The telephone system as set forth in claim 7, wherein the appointment information further includes names, addresses, telephone numbers, appointment locations, and comments of appointments.

9. The telephone system as set forth in claim 7, wherein each respective processor of each respective telephone station, responsive to the input signals, edits the appointment information in the associated memory.

10. The telephone system as set forth in claim 9, wherein each respective processor of each respective telephone station, responsive to the input signals, generates on the respective display the calendar and available dates and time slots for appointments.

11. The telephone system as set forth in claim 10, wherein each respective processor of each respective telephone station displays on the respective display the available dates and time slots with a visual appearance different from the visual appearance of the calendar.

12. The telephone system as set forth in claim 11, wherein the visual appearance of the available dates and time slots includes color reversing the available dates and time slots in reference to a ground of the calendar to highlight the available dates and time slots on the respective display.

13. The telephone system as set forth in claim 10 further including:
each respective processor of each respective telephone station, responsive to a first input signal from the input device corresponding to the respective agent inputting a command, for generating an input screen on the respective display, the respective processor, responsive to a second input signal from the input device corresponding to the respective agent inputting data, for displaying the inputted data on the input screen on the respective display.

14. The telephone system as set forth in claim 13 further including:
the associated memory, coupled to the dialer, for storing dialer information including names and telephone numbers of parties to be automatically dialed by the dialer;
each respective telephone station being operatively coupled to the associated memory, with each respective telephone station further including a buffer for storing dialer information from the associated memory;
the dialer for dialing an outbound call to an intended party, and for responding to a connection of the dialed outbound call as a connected call for generating a connection signal;
the assigning means, responsive to the connection signal, for assigning and connecting the connected call to the available outbound agent;
transfer means, responsive to the connection signal, for transferring the dialer information of the intended party to the respective telephone station assigned to the available outbound agent; and
the respective telephone station of the available outbound agent for displaying the transferred dialer information on the respective display substantially simultaneous with the connecting of the connected call to the available outbound agent.

15. The telephone system as set forth in claim 14 wherein each of the plurality of telephone stations further includes:

the input device for inputting data as dialer information;

a buffer for storing the inputted dialer information; and the processor for displaying the inputted dialer information on the display.

16. The system of claim 3 wherein said display further displays telephone keypad and functions keys for selection of telephone functions including flash and off-hook by said respective agent with said input device.

17. A telephone data collection network which provides a continuous series of telephone calls to a plurality of agents, the network comprising:

a data source computer;

a server computer;

an automatic dialer coupled to the source computer and to the server computer;

a plurality of computer terminals coupled to the server computer;

a plurality of voice communication devices each assigned to a respectively different one of the plurality of computer terminals and having a display device and an input device;

means for providing data communications between the automatic dialer and the data source computer using a first communications protocol;

means for providing data communications between the automatic dialer and the server computer using a second communications protocol;

means for providing data communications between the data source computer and said one of the plurality of computer terminals during an inbound and an outbound call;

means for transmitting phone number data from the data source computer, through the automatic dialer, to the server computer during a first time interval;

means, coupled to said server computer, for causing the automatic dialer to initiate calls during a second time interval, exclusive of said first time interval; and means for causing said data source computer to provide to said one of the plurality of computer terminals record data relating to a caller of an inbound call, during a third time interval exclusive of said first and second time intervals.

\* \* \* \* \*